(12) United States Patent
Jiang et al.

(10) Patent No.: US 11,743,822 B2
(45) Date of Patent: Aug. 29, 2023

(54) METHOD FOR DETECTING INFORMATION, METHOD FOR TRANSMITTING INFORMATION, USER EQUIPMENT AND NETWORK DEVICE

(71) Applicant: VIVO MOBILE COMMUNICATION CO., LTD., Guangdong (CN)

(72) Inventors: Dajie Jiang, Guangdong (CN); Xueming Pan, Guangdong (CN); Lei Jiang, Guangdong (CN); Kai Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 16 days.

(21) Appl. No.: 16/969,275

(22) PCT Filed: Jan. 31, 2019

(86) PCT No.: PCT/CN2019/074180
§ 371 (c)(1),
(2) Date: Aug. 12, 2020

(87) PCT Pub. No.: WO2019/154271
PCT Pub. Date: Aug. 15, 2019

(65) Prior Publication Data
US 2021/0007054 A1    Jan. 7, 2021

(30) Foreign Application Priority Data
Feb. 12, 2018  (CN) .......................... 201810147490.6

(51) Int. Cl.
*H04W 52/02* (2009.01)

(52) U.S. Cl.
CPC ... *H04W 52/0235* (2013.01); *H04W 52/0216* (2013.01)

(58) Field of Classification Search
CPC ......... H04W 52/0235; H04W 52/0216; H04W 76/28; H04W 72/042; H04W 72/0446; H04W 52/0212; H04L 5/0053; H04L 1/0038; Y02D 30/70
See application file for complete search history.

(56) References Cited

U.S. PATENT DOCUMENTS

2012/0275364 A1   11/2012   Anderson et al.
2012/0275366 A1   11/2012   Anderson et al.
(Continued)

OTHER PUBLICATIONS

Extended European Search Report dated Mar. 5, 2021 issued in PCT/CN2019/074180.
(Continued)

*Primary Examiner* — Dinh Nguyen
(74) *Attorney, Agent, or Firm* — Brooks Kushman P.C.

(57) ABSTRACT

A method for detecting information, a method for transmitting information, a user equipment and a network device are provided. The method includes: obtaining a time gap between a first occasion and a second occasion; and determining an occasion of an early indication signal or an occasion of a PDCCH corresponding to the early indication signal based on the time gap. The first occasion is the occasion of the early indication signal, and the second occasion is the occasion of the physical downlink control channel (PDCCH) corresponding to the early indication signal.

18 Claims, 4 Drawing Sheets

(56) References Cited

U.S. PATENT DOCUMENTS

| | | | | |
|---|---|---|---|---|
| 2014/0022909 | A1* | 1/2014 | Mahmoud | H04W 76/28 370/241 |
| 2017/0367069 | A1* | 12/2017 | Agiwal | H04W 68/005 |
| 2018/0332533 | A1* | 11/2018 | Bhattad | H04W 74/0833 |
| 2019/0045481 | A1* | 2/2019 | Sang | H04B 1/713 |
| 2020/0029276 | A1* | 1/2020 | Kim | H04W 52/0206 |

OTHER PUBLICATIONS

3GPP TSG RAN WG1 Meeting #90bis; R1-1718141; Prague, Czechia, Oct. 9-13, 2017; "Wake-up signal configurations and procedures"; 7 pages.

3GPP TSG RAN WG1 Meeting #91; R1-1719471; Reno, USA, Nov. 27-Dec. 1, 2017; "On configurations and procedures of power saving signal"; 6 pages.

3GPP TSG RAN WG1 Meeting 91; R1-1719878; Reno, USA, Nov. 27-Dec. 1, 2017; "Discussion on wake up signal configurations and procedures"; 5 pages.

3GPP TSG RAN WG1 Meeting #91; R1-1720422; Reno, USA, Nov. 27-Dec. 1, 2017; "Further discussion on Wake-up signal functions"; 10 pages.

3GPP TSG RAN WG2 NR #99; R2-1709652; Aug. 21-Aug. 25, 2017; Berlin, Germany; "Wake-Up Signaling for C-DRX Mode"; 5 pages.

Japanese Office Action dated Sep. 17, 2021, issued in JP2020564998.

First Office Action for Korean Application No. 10-2020-7026069, dated Jul. 26, 2022, 5 Pages.

First Office Action for Korean Application No. 9-5-2022-055832845, dated Jul. 26, 2022, 5 Pages.

Ericsson, "RAN1 Agreements for Rel-15 Further NB-IoT Enhancements," 3GPP TSG-RAN WG1 #91, Agenda item 6.2.6, Nov. 27-Dec. 1, 2017, R1-1721314, Reno, NV, US, 12 Pages.

* cited by examiner

METHOD FOR DETECTING INFORMATION, METHOD FOR TRANSMITTING INFORMATION, USER EQUIPMENT AND NETWORK DEVICE

CROSS-REFERENCE TO RELATED APPLICATION

This application is the U.S. national phase of PCT Application No. PCT/CN2019/074180 filed on Jan. 31, 2019, which claims a priority to Chinese Patent Application No. 201810147490.6 filed on Feb. 12, 2018, the disclosure of which are incorporated in their entirety by reference herein.

TECHNICAL FIELD

The present disclosure relates to the field of communication technology, and in particular to a method for detecting information, a method for transmitting information, a user equipment, and a network device.

BACKGROUND

In fourth generation ($4^{th}$ Generation, 4G) and fifth generation ($5^{th}$ Generation, 5G) communications systems, in order to further reduce power consumption of blind detection of a paging (Paging) signal, or power consumption of blind detection of a physical downlink control channel (Physical Downlink Control Channel, PDCCH), for a discontinuous reception (Discontinuous Reception, DRX) scenario, concepts of wake-up signal (wake-up signal, WUS) and go-to-sleep signal (Go To Sleep Signal, GTS) are proposed. Detection of the WUS or the GTS is less complex and more power efficient, as compared with blind detection of the paging signal or the PDCCH. Although the WUS or the GTS can indicate whether to perform detection of PDCCH in a next DRX cycle, it cannot be determined when to detect the WUS, the GTS, and the PDCCH indicated by them.

SUMMARY

Some embodiments of the present disclosure provide a method for detecting information, a method for transmitting information, a user equipment, and a network device, to solve the problem in the related technologies that a user equipment cannot determine detection positions of a WUS, a GTS, and a PDCCH.

In a first aspect, some embodiments of the present disclosure provide a method for detecting information, operable by a user equipment, including:

obtaining a time gap between a first occasion and a second occasion, where the first occasion is an occasion of an early indication signal, and the second occasion is an occasion of a physical downlink control channel (PDCCH) corresponding to the early indication signal; and determining the occasion of the early indication signal or the occasion of the PDCCH corresponding to the early indication signal, based on the time gap.

In a second aspect, some embodiments of the present disclosure provide a user equipment, including:

a first obtaining module, configured to obtain a time gap between a first occasion and a second occasion, where the first occasion is an occasion of an early indication signal, and the second occasion is an occasion of a physical downlink control channel (PDCCH) corresponding to the early indication signal; and a first determining module, configured to determine the occasion of the early indication signal or the occasion of the PDCCH corresponding to the early indication signal, based on the time gap.

In a third aspect, some embodiments of the present disclosure provide a user equipment. The user equipment includes a processor, a memory, and a computer program stored on in memory and executable by the processor, where the processor is configured to, when executing the computer program, perform the steps of the method for detecting information.

In a fourth aspect, some embodiments of the present disclosure provide a computer readable storage medium, having a computer program stored thereon, where the computer program, when being executed by a processor, configure the processor to perform the steps of the method for detecting information.

In a fifth aspect, some embodiments of the present disclosure provide a method for transmitting information, operable by a network device, including:

obtaining a time gap between a first occasion and a second occasion, where the first occasion is an occasion of an early indication signal, and the second occasion is an occasion of a physical downlink control channel (PDCCH) corresponding to the early indication signal; and determining, based on the time gap, the occasion of transmitting the early indication signal or the occasion of transmitting the PDCCH corresponding to the early indication signal.

In a sixth aspect, some embodiments of the present disclosure provide a network device, including:

a second obtaining module, configured to obtain a time gap between a first occasion and a second occasion, where the first occasion is an occasion of an early indication signal, and the second occasion is an occasion of a physical downlink control channel (PDCCH) corresponding to the early indication signal; and a third determining module, configured to determine, based on the time gap, the occasion of transmitting the early indication signal or the occasion of transmitting the PDCCH corresponding to the early indication signal.

In a seventh aspect, some embodiments of the present disclosure provide a network device. The network device includes a processor, a memory, and a computer program stored in the memory and executable by the processor, where the processor is configured to, when executing the computer program, perform the steps of the method for transmitting information.

In an eighth aspect, some embodiments of the present disclosure provide a computer readable storage medium, having a computer program stored thereon, where the computer program, when being executed by a processor, configure the processor to perform the steps of the method for transmitting information.

In some embodiments of the present disclosure, the time gap between the first occasion and the second occasion is determined, and the occasion of the early indication signal or the occasion of the PDCCH corresponding to the early indication signal is determined based on the time gap. In this way, the user equipment can perform detection upon arrival of the corresponding time, which further reduces blind detection complexity and detection power consumption for the user equipment. In addition, in some embodiments of the present disclosure, time gaps with different lengths can be determined based on user equipments that are of different types and with different capabilities, which reduces the unnecessary latency between the early indication signal and the corresponding PDCCH.

BRIEF DESCRIPTION OF THE DRAWINGS

To better clarify technical solutions of some embodiments of the present disclosure, drawings used in descriptions of some embodiments of the present disclosure are briefly introduced hereinafter. Apparently, the described drawings merely illustrate a part of the embodiments of the present disclosure. A person ordinary skilled in the art can obtain other drawings based on the described drawings.

DETAILED DESCRIPTION

Exemplary embodiments of the present disclosure are described in more detail with reference to the accompanying drawings hereinafter. Although the drawings show exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

Terms such as "first" and "second" in the specification and the claims of the present disclosure are used to distinguish similar objects and are not necessarily used to describe a specific order or sequence. It should be understood that the terms used in this way may be interchanged under appropriate circumstances, so that the embodiments of the present application described herein may be implemented in a sequence other than those illustrated or described herein. In addition, terms such as "including" and "having" and any variations thereof are intended to cover non-exclusive inclusion. For example, a process, method, system, product or device including a series of steps or units is not limited to the steps or units that are clearly listed and may include other steps or units that are not clearly listed or are inherent to the process, method, product, or device.

In 4G and 5G communication systems, a user equipment in a radio resource control idle (Radio Resource Control idle, RRC idle) state needs to detect at a pre-configured time a paging signal sent by a network device. The specific process for the paging signal includes: performing blind detection for a PDCCH corresponding to a paging radio network temporary identity (Paging Radio Network Temporary Identity, P-RNTI); if the PDCCH is not detected, ending this detection; if the PDCCH is detected, detecting a physical downlink shared channel (Physical Downlink Share Channel, PDSCH) indicated by the PDCCH, and if the detected PDSCH is not the paging signal of the user equipment, ending the detection. In the RRC idle state, the user equipment periodically performs detection of the paging signal, power consumption at each detecting of the PDCCH and the PDSCH is large, and the probability of the case where the detected paging signal belongs to the user equipment is low, which is not conducive to power saving of the user equipment.

Figure 1:
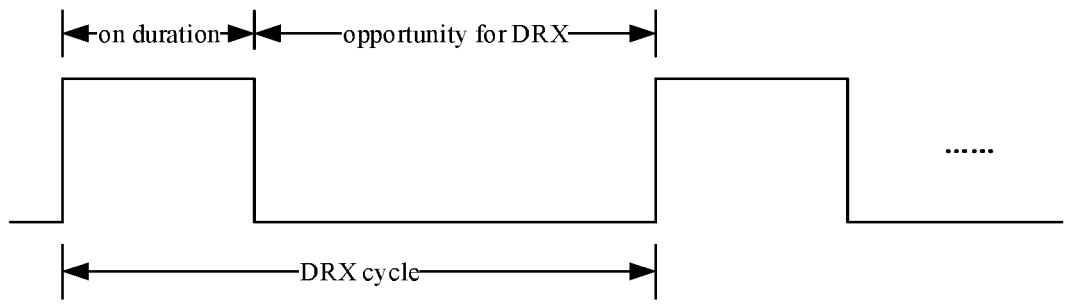
FIG. 1 is a schematic diagram of a time domain of a DRX cycle.

In a discontinuous reception (Discontinuous Reception, DRX) scenario, the basic mechanism of DRX is as follows: a DRX cycle is configured for a user equipment in a connected (RRC_connected) state, as shown in FIG. 1 which is a schematic diagram of a time domain of a DRX cycle; the DRX cycle includes on duration (On Duration) and opportunity for DRX (Opportunity for DRX); the user equipment monitors and receives the PDCCH during the on duration, and the user equipment does not receive data of the downlink channel during the opportunity for DRX to reduce power consumption. In other words, in the time domain, the time is divided into successive DRX cycles. The DRX start offset (drxStartOffset) is used to indicate the start subframe of the DRX cycle, and the long DRX cycle (longDRX-Cycle) is used to indicate how many subframes are occupied by the long DRX cycle. These two parameters are determined by the longDRX-CycleStartOffset field. The on duration timer (On Duration Timer) specifies the number of consecutive subframes (that is, the number of subframes for which the on duration lasts) in which the PDCCH needs to be monitored, starting from the start subframe of the DRX cycle.

In most cases, after a user equipment is scheduled to receive or transmit data in a certain subframe, it is likely to continue to be scheduled in the next several subframes. If it waits for the next DRX cycle to perform reception or transmission, these pieces of data may bring additional latency. In order to reduce such latency, the user equipment continues being in the active period after being scheduled, that is, it continues monitoring the PDCCH during the configured active period. Specifically, when the user equipment is scheduled to initially transmit data, an inactivity timer (drx-InactivityTimer) is started or restarted, and the user equipment is always in the active period when the timer does not expire. Drx-InactivityTimer specifies, the number of consecutive subframes of continuously being in the active state after the user equipment successfully decodes the PDCCH indicating the initially transmitted uplink (Uplink, UL) or downlink (Downlink, DL) user data. That is, the timer is restarted each time the user equipment has initial transmission data to be scheduled.

Figure 2:
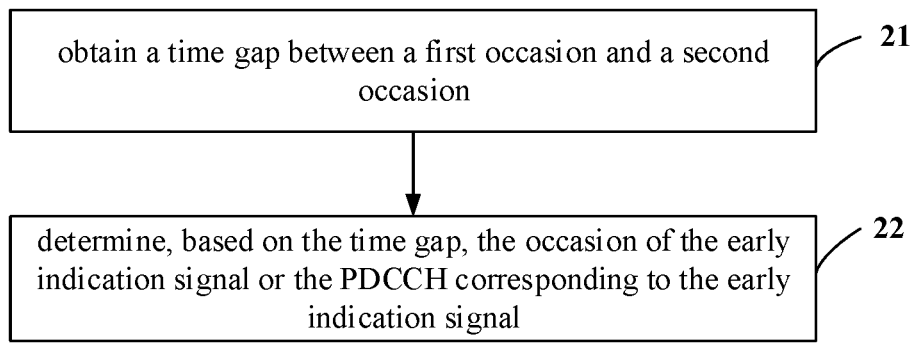
FIG. 2 is a schematic flowchart of a method for detecting information according to some embodiments of the present disclosure.

Some embodiments of the present disclosure provide a method for detecting information, which is operable by a user equipment. As shown in FIG. 2, the method includes steps 21 to 22.

Step 21 includes: obtaining a time gap between a first occasion and a second occasion.

The first occasion is an occasion of an early indication signal, and the second occasion is an occasion of a physical downlink control channel (PDCCH) corresponding to the early indication signal. The early indication signal includes at least one of: a wake-up signal (WUS) or a go-to-sleep signal (GTS). The first occasion or the second occasion is configured by a network device for the user equipment, or, the first occasion or the second occasion is determined by the user equipment based on identification information of the user equipment.

Figure 3:
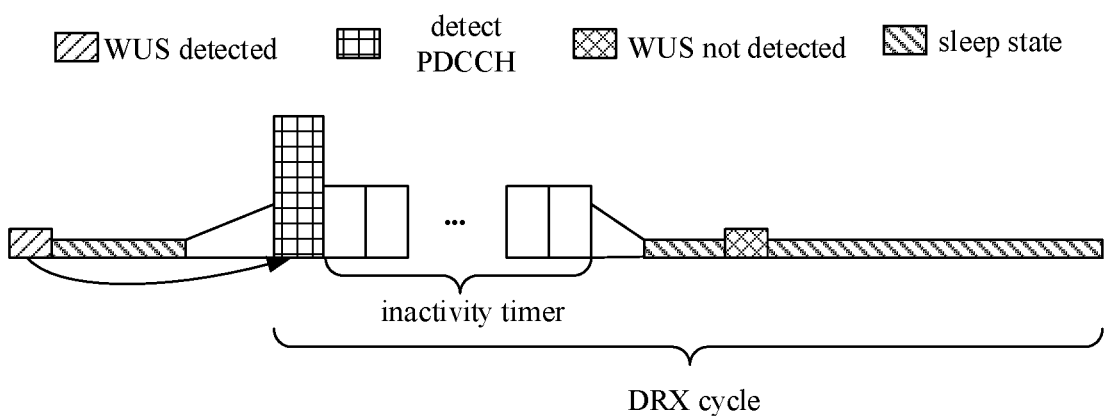
FIG. 3 is a schematic diagram of a time domain of a DRX cycle according to some embodiments of the present disclosure.

In order to further reduce power consumption of blind detection for the paging signal or the PDCCH in the DRX scenario, the concepts of WUS and GTS are proposed, where the WUS and the GTS are collectively referred to as early indication signals. In each DRX cycle in the idle state or the RRC connected state, or in the RRC connected state (e.g., DRX OFF), before the user equipment performs the blind detection for the paging signal or the PDCCH, the network device transmits a WUS to the user equipment, and the user equipment wakes up at the corresponding time to detect the WUS. If the WUS is detected by the user equipment, the user equipment performs the blind detection for the paging signal or the PDCCH; otherwise, the user equipment does not perform the blind detection for the paging signal or the PDCCH, and continues to sleep. As shown in FIG. 3, it is assumed that the user equipment can detect the WUS in the physical channel when the network device configures the WUS for the user equipment; if the WUS is detected, it is determined that PDCCH detection is required in the next DRX cycle; if the WUS is not detected, it is determined that PDCCH detection is not required in the next DRX cycle and the sleep state is continued. Or, in each DRX cycle in the idle state or the RRC connected state, before the user equipment performs the blind detection for the paging signal or the PDCCH, the network device may transmit a GTS to the user equipment, and the user equipment wakes up at the corresponding time to detect the GTS. If the GTS is detected by the user equipment, the user equipment does not perform the blind detection for the paging signal or the PDCCH, and continues to sleep; otherwise, the user equipment performs the blind detection for the paging signal or the PDCCH. Detection of the WUS or the GTS is less complicated and more power efficient, as compared with blind detection of the paging signal or the PDCCH.

Further, the early indication signal may be with discontinuous transmission (Discontinuous Transmission, DTX) or without DTX. A case of being with DTX is taken as an example: in a case that the early indication signal carries a WUS sequence, it is determined that PDCCH detection is required in the next DRX cycle if the WUS sequence is detected by the user equipment, and it is determined that PDCCH detection is not required in the next DRX cycle if the WUS sequence is not detected; similarly, in a case that the early indication signal carries a GTS sequence, it is determined that PDCCH detection is required in the next DRX cycle if the GTS sequence is not detected, and it is determined that PDCCH detection is not required in the next DRX cycle if the GTS sequence is detected. A case of being without DTX is taken as an example: in a case that the early indication signal carries a WUS sequence, it is determined that the corresponding PDCCH needs to be detected in the next DRX cycle if the WUS sequence is detected as a first sequence format, and it is determined that there is no need to detect the corresponding PDCCH in the next DRX cycle and the user equipment continues to sleep if the WUS is detected as a second sequence format; similarly, in a case that the early indication signal carries a GTS sequence, it is determined that the corresponding PDCCH needs to be detected in the next DRX cycle if the GTS sequence is detected as a third sequence format, and it is determined that there is no need to detect the corresponding PDCCH in the next DRX cycle and the user equipment continues to sleep if the GTS is detected as a fourth sequence format.

In the idle state, the time gap between the first occasion and the second occasion can be: a time interval between an occasion of the WUS and an occasion of the paging signal corresponding to the WUS, that is, a time gap between the WUS and the paging occasion (Paging Occasion, PO). In the RRC_connected state, the time gap between the first occasion and the second occasion can be: a time gap between an occasion of the WUS (such as a slot or a subframe where it is located) and an occasion of the PDCCH (such as a slot or a subframe where it is located) corresponding to the WUS.

Step 22 includes: determining, based on the time gap, the occasion of the early indication signal or the occasion of the PDCCH corresponding to the early indication signal.

Step 22 may be implemented in, but not limited to, the following manners.

The first manner includes: determining the occasion of the PDCCH corresponding to the early indication signal based on the first occasion and the time gap, in a case that the first occasion is determined.

The first occasion is configured by the network device for the user equipment, or the first occasion is determined by the user equipment based on the identification information (UE ID) of the user equipment. That is, the user equipment determines the occasion of detecting the PDCCH corresponding to the early indication signal based on the time gap and the occasion of the early indication signal, wherein the occasion of the early indication signal is configured by the network device or determined by the user equipment based on the UE ID.

The second manner includes: determining the occasion of the early indication signal based on the second occasion and the time gap, in a case that the second occasion is determined.

The second occasion is configured by the network device for the user equipment, or the second occasion is determined by the user equipment based on the identification information (UE ID) of the user equipment. That is, the user equipment determines the occasion of detecting the early indication signal based on the time gap and the occasion of the PDCCH corresponding to the early indication signal, where the occasion of the PDCCH corresponding to the early indication signal is configured by the network device or determined by the user equipment based on the UE ID.

In an embodiment, after step 22, the method further includes: detecting the early indication signal at the determined occasion of the early indication signal, or detecting the PDCCH at the determined occasion of the PDCCH corresponding to the early indication signal.

It should be noted that, the step of detecting the early indication signal at the determined occasion of the early indication signal is performed in a case that only the occasion of the early indication signal is determined in step 22, and the step of detecting the PDCCH at the determined occasion of the PDCCH corresponding to the early indication signal is performed in a case that only the occasion of the PDCCH corresponding to the early indication signal is determined in step 22.

Optionally, the step of determining the occasion of the early indication signal includes: determining a start time or an end time of a maximum duration of the early indication signal, or, determining a start time or an end time of an actual duration of the early indication signal.

The network device may configure a group of actual durations for the early indication signal of the user equipment, where the group of actual durations includes at least one actual duration. The network device may configure a limited number of durations (WUS actual duration) for all user equipments in a cell, for example, the number of repetitions is 1, 10, or 100. The actual duration has only one possible position (the only position) within the maximum duration, that is, there is a first duration between the start time of the actual duration of the early indication signal and the start time of the longest duration of the early indication signal, where the first duration is greater than or equal to 0 time domain transmission unit. When the first duration is 0 time domain transmission unit, the start time of the actual duration of the early indication signal is the same as the start time of the longest duration (i.e., coinciding). Or, there is a second duration between the end time of the actual duration of the early indication signal and the end time of the longest duration of the early indication signal, where the second duration is greater than or equal to 0 time domain transmission unit. When the second duration is 0 time domain transmission unit, the end time of the actual duration of the early indication signal is the same as the end time of the longest duration (i.e., coinciding). The number of the actual duration is at least one, and the start time of each of the at least one actual duration is the same as the start time of the maximum duration of the early indication signal; or, the number of the actual duration is at least one, and the end time of each of the at least one actual duration is the same as the end time of the maximum duration.

In a case that the number of the actual duration is at least two, after the step of determining the start time or the end time of the actual duration of the early indication signal, the method further includes: performing blind detection in the at least two actual durations. That is, in a case that the network device configures a group of actual durations for the early indication signal of the user equipment, after determining the start time or the end time of the early indication signal, the user equipment may perform blind detection in the various possible actual durations based on the start time or the end time of the early indication signal.

In some optional embodiments, the first occasion is the start time or the end time of the maximum duration of the early indication signal, that is, the occasion of the early indication signal is the start time or the end time of the maximum duration of the early indication signal, where the maximum duration of the early indication signal is explained as follows. In order to improve the transmission reliability of the early indication signal, different numbers of repetitions of the early indication signal may be set for different user equipments or cells; the different numbers of repetitions are realized based on repeatedly transmitting time domain transmission unit(s) in the time, and the time domain transmission unit(s) may be a frame, a subframe (subframe), a slot (slot) or a time domain symbol (an OFDM symbol). For example, for a user equipment in the center a cell, the number of repetitions for the early indication signal is 1, and for a user equipment at the edge of the cell, the number of repetitions for the early indication signal is 100. The higher the number of repetitions for a signal is, the better the coverage performance of the signal is. The duration corresponding to the maximum number of repetitions for the early indication signal is the maximum duration (maximum duration) of the early indication signal. The maximum duration of the early indication signal determines the coverage area of the cell, and the maximum duration of the early indication signal is notified to the user equipment through a system information block (SIB) message.

Or, the first occasion is the start time or the end time of the actual duration of the early indication signal, that is, the occasion of the early indication signal is the start time or the end time of the actual duration of the early indication signal. The duration corresponding to the actual number of repetitions of the early indication signal is the actual duration (actual duration) of the early indication signal. The actual duration has only one possible position (the only position) within the maximum duration, that is, there is a first duration between the start time of the actual duration of the early indication signal and the start time of the longest duration of the early indication signal, where the first duration is greater than or equal to 0 time domain transmission unit. When the first duration is 0 time domain transmission unit, the start time of the actual duration of the early indication signal is the same as the start time of the longest duration (i.e., coinciding). Or, there is a second duration between the end time of the actual duration of the early indication signal and the end time of the longest duration of the early indication signal, where the second duration is greater than or equal to 0 time domain transmission unit. When the second duration is 0 time domain transmission unit, the end time of the actual duration of the early indication signal is the same as the end time of the longest duration (i.e., coinciding).

In an optional embodiment, the network device may configure a group of actual durations for the early indication signal of the user equipment, where the group of actual durations includes at least one actual duration. The network device may configure a limited number of durations (WUS actual duration) for all user equipments in a cell, for example, the number of repetitions is 1, 10, or 100. The network devices may notify the several WUS actual durations in the above to the user equipment through signaling such as RRC signaling. One WUS repetition occupies all OFDM symbols or part of OFDM symbols of a slot or a subframe in the time, such as occupying the last 11 OFDM symbols of a subframe. Multiple WUS repetitions occupy continuous or non-continuous slots or subframes. Further, in the embodiment, the start time of the actual duration of the early indication signal coinciding with the start time of the longest duration of the early indication signal refers to that: the start time of each actual duration among the various actual durations coincide with the start time of the maximum duration of the early indication signal. Similarly, the end time of the actual duration of the early indication signal coinciding with the end time of the longest duration of the early indication signal refers to that: the end time of each actual duration among the various actual durations coincides with the end time of the maximum duration of the early indication signal.

In some optional embodiments, the second occasion is a start time or an end time of time domain transmission unit(s) where the PDCCH is located, where the time domain transmission unit(s) includes any of the following: a frame, a subframe, a slot, or a time domain symbol (an OFDM symbol). In other words, the occasion of the PDCCH is the start time or the end time of the OFDM symbol, slot, subframe, or frame where the PDCCH is located.

Optionally, a duration of the time gap is related to at least one of the following:

A type of a receiver that receives the early indication signal. The type of the receiver includes a main receiver and a non-main receiver (or referred to as other receiver, dedicated receiver). That is, the corresponding duration of the time gap for a case where the user equipment uses the independent non-main receiver to receive the early indication signal is different from the corresponding duration of the time gap for a case where the user equipment uses the main receiver receive the early indication signal. When the user equipment adopts the independent non-main receiver to receive the early indication signal, the main receiver is used to receive other signals except the early indication signal. Optionally, if the early indication signal is received by the independent receiver (the non-main receiver), then the user equipment may make some optimizations for energy saving, for example, the independent receiver only supports a small bandwidth, and some modules are deleted, etc.; and the main receiver is used to receive signals other than the early indication signal. If the user equipment receives the early indication signal and the PDCCH corresponding to the early indication signal via the main receiver, the user equipment does not need to perform RF retuning, so that the time gap can be shorter. When different receivers are used, the values of the determined time gaps are also different. Optionally, the user equipment may report both the value of the time gap and whether the WUS is supported A preset behavior of the user equipment. The preset behavior includes: the user equipment performing downlink synchronization only based on the early indication signal, or, the user equipment performing downlink synchronization based on the early indication signal and a synchronous signal block (Synchronous Signal Block, SSB), or, the user equipment performing downlink synchronization only based on a synchronous signal block. That is, the time gap is related to the preset behavior of the user equipment. The preset behavior includes: the user equipment performing downlink synchronization only based on WUS or GTS, or, the user equipment performing downlink synchronization based on WUS, GTS and SSB, or, the user equipment performing downlink synchronization only based on SSB. The user equipment performing downlink synchronization only based on the SSB includes two situations: the user equipment performing downlink synchronization based on the SSB before receiving WUS, and the user equipment performing downlink synchronization based on the SSB after receiving WUS and before receiving PDCCH. The above SSB is only for the NR system, but other systems are not excluded for this embodiment. Specifically, this embodiment includes: in the NB-IoT system, the user equipment performs downlink synchronization based on NPSS/NSSS (Narrowband Primary Synchronization Signal/Narrowband Secondary Synchronization Signal); in the LTE system or MTC system, the user equipment performs downlink synchronization based on PSS/SSS (Primary Synchronization Signal/Secondary Synchronization Signal); in the 5G NR (New Radio) system, the user equipment performs downlink synchronization based on SSB. In an embodiment, the time gap is related to the behavior of the UE, and the behavior includes: the user equipment performing downlink synchronization based on WUS, or the user equipment periodically performing downlink synchronization based on SSB. If the user equipment only uses WUS to perform downlink synchronization, and if the network device sends DTX for several consecutive paging cycles, then in the subsequent the time for downlink synchronization may be relatively long when the user equipment receives non-DTX WUS, resulting in increased time gap between WUS and PDCCH corresponding to the WUS; if the user equipment periodically performs downlink synchronization based on SSB, the user equipment may flexibly set the size of the period to maintain good downlink synchronization, and in the subsequent the time for downlink synchronization may be relatively short when the user equipment receives non-DTX WUS, resulting in increased time gap between WUS and PDCCH corresponding to the WUS. Therefore, when the behaviors of the user equipment are different, the values of the time gaps reported by the user equipment are also different. The user equipment performing downlink synchronization only based on SSB includes two situations: the user equipment performing downlink synchronization based on the SSB before receiving WUS, and the user equipment performing downlink synchronization based on the SSB after receiving WUS before receiving PDCCH.

A frequency domain transmission resource of the early indication signal, and a frequency domain transmission resource of the PDCCH corresponding to the early indication signal. In other words, the time gap is related to the frequency domain resource of the user equipment receiving WUS or GTS and the frequency domain resource of the user equipment receiving PDCCH. In an embodiment, the time gap corresponding to a case where the center frequency of the frequency domain resource of the user equipment for receiving WUS or GTS is different from the center frequency of the frequency domain resource of the user equipment for receiving PDCCH, is longer than, the time gap corresponding to a case where the center frequency of the frequency domain resource of the user equipment for receiving WUS or GTS is the same as the center frequency of the frequency domain resource of the user equipment for receiving PDCCH; the frequency domain resource may be a bandwidth part (Bandwidth Part, BWP), a bandwidth (bandwidth) or a channel (channel). The time for radio frequency retuning (Radio Frequency retuning, RF retuning) corresponding to a case where the center frequency of the frequency domain resource of the user equipment for receiving WUS or GTS is different from the center frequency of the frequency domain resource of the user equipment for receiving PDCCH, is longer than, the time for RF retuning corresponding to a case where the center frequency of the frequency domain resource of the user equipment for receiving WUS or GTS is the same as the center frequency of the frequency domain resource of the user equipment for receiving PDCCH, hence, the time gap corresponding to the case where the center frequencies are different is longer than the time gap corresponding to the case the center frequencies are the same.

The time gap is determined by the user equipment, or, the time gap is configured by the network device for the user equipment, or, the time gap is predefined by a protocol. Specifically, the time gap includes at least one of: a first time gap determined by the user equipment, a second time gap configured by the network device for the user equipment, or, a third time gap predefined by the protocol.

Based on different ways of determining the time gap, the following scenarios are further illustrated in some embodiments of the present disclosure.

In the first scenario: the time gap only includes the first time gap, that is, the time gap is determined by the user equipment itself.

In this scenario, the user equipment may determine the length of the time gap based on at least one of the following: the type of receiver that receives the early indication signal, the preset behavior of the user equipment; the frequency domain transmission resource of the early indication signal and the frequency domain transmission resource of the PDCCH corresponding to the early indication signal.

After the user equipment determines the first time gap, it reports the first time gap to the network device. The first time gap reported by the user equipment may be reported by 1 bit. For example, 0 represents that the first time gap is 10 ms (the receiver that receives the WUS is the main receiver), and 1 represents that the first time gap is 30 ms (the receiver that receives the WUS is the separate non-main receiver). Or, the first time gap reported by the user equipment may be reported by 2 bits. For example, 00 represents that the first time gap is 10 ms (the WUS is received by the main receiver, and the UE supports periodic downlink synchronization through SSB); 01 represents that the first time gap is 20 ms (the WUS is received by the main receiver and the user equipment does not support periodic downlink synchronization through SSB; or, the WUS is received by the main receiver, the user equipment supports periodic downlink synchronization through SSB, and the period is very long; or, the WUS is received by the main receiver and the user equipment only supports downlink synchronization through WUS); 10 represents that the first time gap is 40 ms (the receiver that receives the WUS is the separate receiver and the UE supports periodic downlink synchronization through SSB); 11 represents that the first time gap is 80 ms (the receiver that receives the WUS is the separate receiver and the user equipment does not support periodic downlink synchronization through SSB; or, the receiver that receives the WUS is the separate receiver, the UE supports periodic downlink synchronization through SSB, and the period is very long; or, the receiver that receives the WUS is the separate receiver and only downlink synchronization through WUS is supported).

In the second scenario2: the time gap includes only the second time gap, that is, the time gap is configured by the network device for the user equipment.

In this scenario, the network device may determine and configure for the user equipment the length of the time gap based on at least one of the following: the type of receiver that receives the early indication signal, the preset behavior of the user equipment; the frequency domain transmission resource of the early indication signal and the frequency domain transmission resource of the PDCCH corresponding to the early indication signal.

In this scenario, before the network device determines the time gap, the user equipment reports the type of the receiver receiving the early indication signal and the preset behavior of the user equipment (or the behavior capability of the user equipment) to the network device, so that the network device may determine the duration of the time gap.

Optionally, the network device determines the maximum value among different first time gaps related to user equipments with different capabilities as the second time gap, and notifies the user equipment of the second time gap.

Optionally, the time gap is configured by the network device for one user equipment or a group of user equipments through preset signaling, where the preset signaling includes at least one of: broadcast signaling, radio resource control (RRC) signaling, media access control (Media Access Control, MAC) control element (Control Element, CE), or a PDCCH. The broadcast signaling includes: a master information block (Master Information Block, MIB), a system information block (System Information Block, SIB), etc.

In another optional embodiment, after step 21, the method further includes: determining a target synchronization manner for downlink synchronization based on the time gap. The target synchronization manner includes: performing downlink synchronization based on the early indication signal, or, performing downlink synchronization based on the early indication signal and a synchronous signal block, or, performing downlink synchronization based on a synchronous signal block. In other words, when the time gap is the second time gap configured by the network device, the user equipment may determine the related behavior based on the second time gap; for example, the user equipment performs downlink synchronization through WUS or GTS, or, the user equipment periodically performs downlink synchronization through SSB, or, the user equipment performs downlink synchronization through combination of WUS or GTS with SSB.

Specifically, when the values of the second time gaps configured by the network device for the user equipment are different, the behavior of the user equipment are also affected. If the time gap between the WUS and the PDCCH corresponding to WUS, configured by the network device for the user equipment, is relatively long, if the user equipment may only performs downlink synchronization through WUS, even if the network device sends DTX consecutively for several paging cycles, then in the subsequent the time for downlink synchronization may be relative abundant when the user equipment receives non-DTX WUS. If f the time gap between the WUS and the PDCCH corresponding to WUS, configured by the network device for the user equipment, is relatively short, then the user equipment may periodically perform downlink synchronization through SSB (SS block), and the user equipment may flexibly set the size of the period to maintain good downlink synchronization, so that in the subsequent the time for downlink synchronization when the user equipment receives non-DTX WUS will not exceed the second time gap configured by the base station for the user equipment.

In the third scenario: the time gap includes the first time gap and the second time gap, that is, the time gap is the second time gap configured by the network device for the user equipment based on the first time gap.

In this scenario, the user equipment may determine the length of the first time gap based on at least one of the following: the type of receiver that receives the early indication signal, the preset behavior of the user equipment; the frequency domain transmission resource of the early indication signal and the frequency domain transmission resource of the PDCCH corresponding to the early indication signal.

After the user equipment determines the first time gap, it reports the first time gap to the network device. The reporting manner thereof may be the manner in the first scenario, which is not repeated herein. After obtaining the first time gap, the network device configures the second time gap for the user equipment with reference to the first time gap. For the manner in which the network device sends the second time gap to the user equipment, reference can be made to the indication manner in the second scenario, which is not repeated herein.

Optionally, the network device determines the maximum value among different first time gaps reported by different user equipments as the second time gap, and notifies the user equipment of the second time gap. For example, if some user equipments report a time gap of 10 ms, and other user equipments report a time gap of 30 ms, then the network device configures the second time gap to be 30 ms, which can meet the needs of all user equipments.

In the fourth scenario: the time gap includes the third time gap, that is, the time gap is predefined by the protocol.

In this scenario, the time gap is a fixed duration predefined by the protocol. For example, the time gap is predefined by the protocol as M time domain transmission units, such as subframes, slots, or OFDM symbols, then, after the occasion of the early indication signal is determined, the occasion of the PDCCH corresponding to the early indication signal may be determined based on the occasion of the early indication signal and the M time domain transmission units. Similarly, after determining the occasion of the PDCCH corresponding to the early indication signal, the occasion of the early indication signal may be determined based on the occasion of the PDCCH corresponding to the early indication signal and the M time domain transmission units.

Optionally, the second time gap predefined by the protocol is the maximum value among different first time gaps related to user equipments with different capabilities. For example, some user equipments support a time gap of 10 ms, and other user equipments support a time gap of 30 ms, then, the protocol predefines the second time gap as 30 ms, which can meet the needs of all user equipments.

In another optional embodiment, after step 21, the method further includes: determining a target synchronization manner for downlink synchronization based on the time gap. The target synchronization manner includes: performing downlink synchronization based on the early indication signal, or, performing downlink synchronization based on the early indication signal and a synchronous signal block, or, performing downlink synchronization based on a synchronous signal block. In other words, when the time gap is the third time gap defined by the protocol, the user equipment may determine the related behavior based on the third time gap; for example, the user equipment performs downlink synchronization through WUS or GTS, or, the user equipment periodically performs downlink synchronization through SSB, or, the user equipment performs downlink synchronization through combination of WUS or GTS with SSB.

The method for detecting information according to some embodiments of the present disclosure are described in the above, which are further described with reference to the drawings and specific implementations hereinafter.

A first embodiment is directed to the first manner in the above, i.e., the scene where the occasion of the early indication signal is known.

The user equipment determines the occasion of detecting the PDCCH corresponding to the early indication signal based on the time gap and the occasion of the early indication signal (i.e., the first occasion). The occasion of the early indication signal is configured by the network device or determined based on the UE ID. The PDCCH corresponding to the early indication signal is a PDCCH that the early indication signal instructs the user equipment to detect.

The user equipment may calculate the occasion of early indication signal based on the UE ID. Specifically, the identification information (UE ID) of the user equipment is mapped to N downlink slots, subframes or frames (N>0) through a certain function such as a hash function. The UE ID includes International Mobile Subscriber Identity (International Mobile Subscriber Identity, IMSI), Packet-Temporary mobile subscriber identification (Packet-Temporary mobile subscriber identification, P-TMS), Temporary mobile subscriber identification (Temporary mobile subscriber identification, TMS), or a short format.

The first occasion is the start time or the end time of the maximum duration of the early indication signal, and the duration corresponding to the maximum number of repetitions for the early indication signal is the maximum duration (maximum duration) of the early indication signal. The maximum duration of the early indication signal determines the coverage area of the cell, and the maximum duration of the early indication signal is notified to the user equipment through a system information block (SIB) message.

Or, the first occasion is the start or the end time of the actual duration of the indication signal in advance, and the network device may configure a limited number of durations (WUS actual duration) for all user equipments in a cell, and notify them to the user equipments through signaling such as RRC signaling.

In an optional embodiment, the network device may not notify the UE of the actual duration of the early indication signal of the UE, such as WUS actual duration. In order to reduce the complexity of detecting WUS for the user equipment, the user equipment may perform blind detection for each type of actual duration of the WUS for only one time, and for each type of WUS actual duration, detection is performed from the first subframe of the WUS. For example, the network device informs the UE that there are three types of WUS actual durations in the cell, such as the numbers of repetitions of WUS being 1, 10, and 100 respectively. The start subframe of WUS actual duration is subframe #0 of radio frame #0, which coincides with the start subframe of WUS maximum duration. The user equipment, in turn, performs WUS detection on subframe #0 of radio frame #0; performs WUS detection on 10 subframes from subframe #0 to subframe #9 of radio frame #0 (when detection is performed on the 10 subframes, the user equipment stops detecting in a case that the user equipment successfully detects the wake-up signal through N (N>1, N<10, and N is an integer) subframes thereof); and performs WUS detection on 100 subframes from subframe #0 of radio frame #0 to subframe #99 of radio frame #9 (when detection is performed on the 100 subframes, the user equipment stops detecting in a case that the user equipment successfully detects the wake-up signal through N (N>1, N<100, and N is an integer) subframes thereof). The above detection sequence may be adjusted; if WUS is successfully detected in a certain detection, the user equipment stops blind detection. Subframes #0 to #99 are the numbers of consecutive subframes that can transmit WUS. Or, the subframes for transmitting WUS may be inconsecutive. The above-mentioned subframe may be replaced by a slot or an OFDM symbol.

Or, WUS actual duration is indicated by a WUS sequence. Specifically, different WUS sequences (such as multiple different root sequences, or multiple sequences with different scrambling sequences, or multiple sequences generated by different cyclic shifts) correspond to different WUS actual durations respectively.

Figure 4:
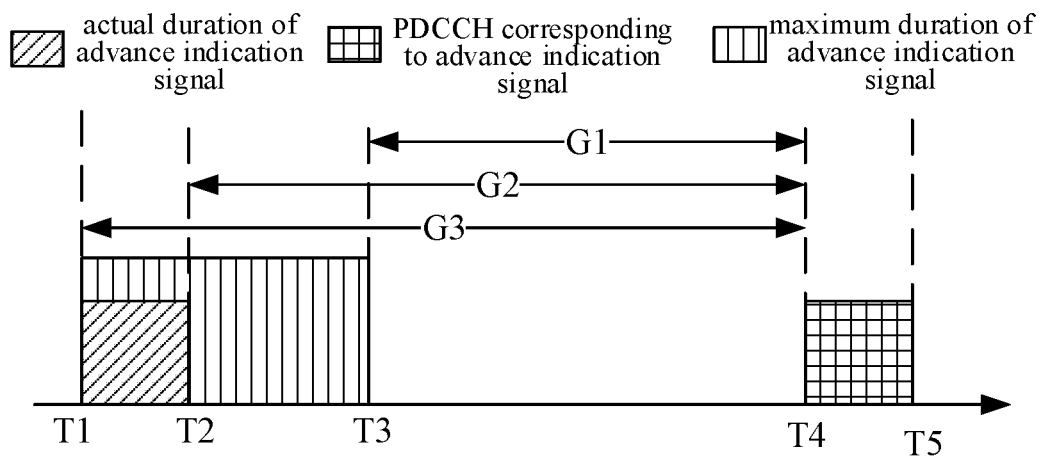
FIG. 4 is a first schematic diagram of resource positions of an early indication signal and a PDCCH according to some embodiments of the present disclosure.

As shown in FIG. 4, T1 is the start time of the actual duration of the early indication signal, and T1 is also the start time of the maximum duration of the early indication signal, that is, the start time of the maximum actual duration of the early indication signal coincides with the start time of the maximum duration of the early indication signal. T2 is the end time of the actual duration of the early indication signal. T3 is the end time of the maximum duration of the early indication signal. T4 is the start time of the PDCCH corresponding to the early indication signal. T5 is the end time of the PDCCH corresponding to the early indication signal. Then, the time gap may be any of the three situations in FIG. 4, i.e., time gap G1=T4−T3, or time gap G2=T4−T2, or time gap G3=T4−T1.

Correspondingly, the user equipment determines T4 based on the time gap G (G1, G2 or G3) and any one of T1, T2, T3, that is, T4=T3+G1, or T4=T2+G2, or T4=T1+G3. T4 in the above embodiment can also be replaced with T5.

Figure 5:
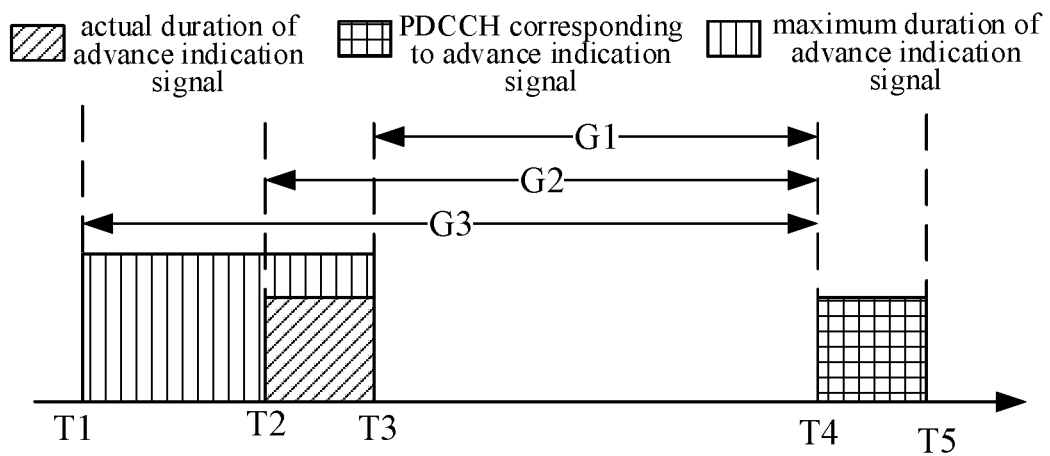
FIG. 5 is a second schematic diagram of resource positions of an early indication signal and a PDCCH according to some embodiments of the present disclosure.

Or, as shown in FIG. 5, T1 is the start time of the maximum duration of the early indication signal, T2 is the start time of the actual duration of the early indication signal, T3 is the end time of the maximum duration of the early indication signal, and T3 is also the end time of the actual duration of the early indication signal, that is, the end time of the maximum duration of the early indication signal is aligned with the end time of the actual duration of the early indication signal. T4 is the start time of the PDCCH corresponding to the early indication signal, and T5 is the end time of the PDCCH corresponding to the early indication signal. Then, the time gap may be any of the three situations in FIG. 5, i.e., time gap G1=T4−T3, or time gap G2=T4−T2, or time gap G3=T4−T1; correspondingly, the user equipment determines T4 based on the time gap G (G1, G2, or G3), and any one of T1, T2, T3; that is, T4=T3+G1, or T4=T2+G2, or T4=T1+G3. T4 can also be replaced with T5.

A second embodiment is corresponding to the second manner, i.e., the scenario where the occasion of the PDCCH corresponding to the early indication signal is known.

The user equipment determines the occasion of the early indication signal based on the time gap and the occasion (i.e., the second occasion) of the PDCCH corresponding to the early indication signal. The occasion of the PDCCH corresponding to the early indication signal is configured by the network device or determined based on the UE ID. The PDCCH corresponding to the early indication signal is a PDCCH that the early indication signal instructs the user equipment to detect.

The user equipment calculates the occasion of the PDCCH corresponding to the early indication signal based on the UE ID, specifically, mapping the identifier of the user equipment (UE ID) to N downlink slots or subframes (N>0) through a certain function such as a hash function; UE ID includes IMSI, P-TMS, TMS or a short format.

As shown in FIG. 4, T1 is the start time of the actual duration of the early indication signal, and T1 is also the start time of the maximum duration of the early indication signal, that is, the start time of the maximum actual duration of the early indication signal coincides with the start time of the maximum duration of the early indication signal. T2 is the end time of the actual duration of the early indication signal. T3 is the end time of the maximum duration of the early indication signal. T4 is the start time of the PDCCH corresponding to the early indication signal. T5 is the end time of the PDCCH corresponding to the early indication signal. Then, the time gap may be any of the three situations in FIG. 4, i.e., time gap G1=T4−T3, or time gap G2=T4−T2, or time gap G3=T4−T1.

Correspondingly, the user equipment determines T1 or T2 or T3 based on the time gap G (G1, G2 or G3) and any one of T4 and T5, that is, T1=T4−G3, or T2=T4−G2, or T3=T4−G1. T4 in the above embodiment can also be replaced with T5.

Or, as shown in FIG. 5, T1 is the start time of the maximum duration of the early indication signal, T2 is the start time of the actual duration of the early indication signal, T3 is the end time of the maximum duration of the early indication signal, and T3 is also the end time of the actual duration of the early indication signal, that is, the end time of the maximum duration of the early indication signal is aligned with the end time of the actual duration of the early indication signal. T4 is the start time of the PDCCH corresponding to the early indication signal, and T5 is the end time of the PDCCH corresponding to the early indication signal.

Then, the time gap may be any of the three situations in FIG. 5, i.e., time gap G1=T4−T3, or time gap G2=T4−T2, or time gap G3=T4−T1.

Correspondingly, the user equipment determines T1, or T2, or T3 based on the time gap G (G1, G2 or G3) and T4, that is, T1=T4−G3, or T2=T4−G2, or T3=T4−G1. T4 in the above embodiment can also be replaced with T5.

In an optional embodiment, the network device may not notify the UE of the actual duration of the early indication signal of the UE. In order to reduce the complexity of detecting the early indication signal for the user equipment, the user equipment may perform blind detection for each type of actual duration of the early indication signal for only one time, and for each type of actual duration of the early indication signal, detection is performed from the first subframe of the early indication signal. For example, the network device informs the UE that there are three types of actual durations for the early indication signal in the cell, such as the numbers of repetitions for the early indication signal being 1, 10, and 100 respectively. The end subframe of actual duration of the early indication signal is subframe #9 of radio frame #9, which coincides with the end subframe of maximum duration of the early indication signal. The user equipment, in turn, performs detection of early indication signal on subframe #9 of radio frame #9; performs detection of early indication signal on 10 subframes from subframe #0 of radio frame #9 to subframe #9 of radio frame #9 (when detection is performed on the 10 subframes, the user equipment stops detecting in a case that the user equipment successfully detects the wake-up signal through N (N>1, N<10, and N is an integer) subframes thereof); and performs detection of early indication signal on 100 subframes from subframe #0 of radio frame #0 to subframe #9 of radio frame #9 (when detection is performed on the 100 subframes, the user equipment stops detecting in a case that the user equipment successfully detects the wake-up signal through N (N>1, N<100, and N is an integer) subframes thereof). The above detection sequence may be adjusted; if the early indication signal is successfully detected in a certain detection, the user equipment stops blind detection. Subframes #0 to #99 are the numbers of consecutive subframes that can transmit early indication signal. Or, the subframes for transmitting early indication signal may be inconsecutive. The above-mentioned subframe may be replaced by a slot or an OFDM symbol.

Or, the actual duration of the early indication signal is indicated by a sequence of the early indication signal. Specifically, different sequences (such as multiple different root sequences, or multiple sequences with different scrambling sequences, or multiple sequences generated by different cyclic shifts) of the early indication signal correspond to different actual durations of the early indication signal respectively.

In the method for detecting information according to some embodiments of the present disclosure, the time gap between the first occasion and the second occasion is determined by the user equipment, and the occasion of the early indication signal or the occasion of the PDCCH corresponding to the early indication signal is determined based on the time gap. In this way, the user equipment can perform detection upon arrival of the corresponding time, which further reduces blind detection complexity and detection power consumption for the user equipment. In addition, in some embodiments of the present disclosure, time gaps with different lengths can be determined based on user equipments that are of different types and with different capabilities, which reduces the unnecessary latency between the early indication signal and the corresponding PDCCH.

The method for detecting information in different scenarios is described in detail in the above embodiments. The corresponding user equipment is described in the following embodiments in conjunction with the accompanying drawings.

Figure 6:
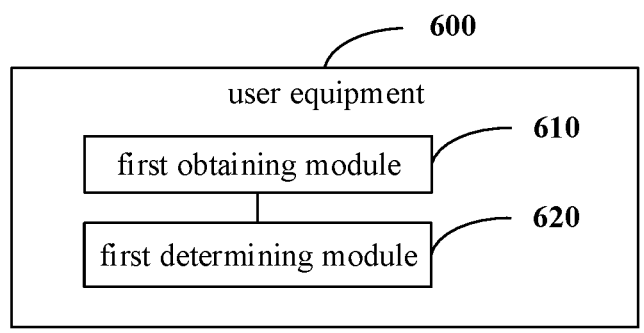
FIG. 6 is a schematic diagram of a module structure of a user equipment according to some embodiments of the present disclosure.

As shown in FIG. 6, the user equipment 600 according to some embodiments of the present disclosure can realize the details of the method in the above embodiments: obtaining the time gap between the first occasion and the second occasion, and determining the occasion of the early indication signal or the occasion of the PDCCH corresponding to the early indication signal, based on the time gap, which can achieve the same effect. The first occasion is an occasion of the early indication signal, and the second occasion is an occasion of the physical downlink control channel (PDCCH) corresponding to the early indication signal. The user equipment 600 specifically includes the following functional modules:

a first obtaining module 610, configured to obtain a time gap between a first occasion and a second occasion, where the first occasion is an occasion of an early indication signal, and the second occasion is an occasion of a physical downlink control channel (PDCCH) corresponding to the early indication signal; and a first determining module 620, configured to determine the occasion of the early indication signal or the occasion of the PDCCH corresponding to the early indication signal, based on the time gap.

The user equipment 600 may further include: a first detecting module, configured to detect the early indication signal at the determined occasion of the early indication signal, or detect the PDCCH at the determined occasion of the PDCCH corresponding to the early indication signal.

The first determining module 620 includes:

a first determining submodule, configured to determine the occasion of the PDCCH corresponding to the early indication signal based on the first occasion and the time gap, in a case that the first occasion is determined.

The first determining module 620 also includes:

a second determining submodule, configured to determine the occasion of the early indication signal based on the second occasion and the time gap, in a case that the second occasion is determined.

The second determining submodule includes:

a first determining unit, configured to determine a start time or an end time of a maximum duration of the early indication signal, or, a second determining unit, configured to determine a start time or an end time of an actual duration of the early indication signal.

The number of the actual duration is at least one, and the start time of each of the at least one actual duration is the same as the start time of the maximum duration of the early indication signal; or, the number of the actual duration is at least one, and the end time of each of the at least one actual duration is the same as the end time of the maximum duration.

The user equipment further includes:

a blind detection module, configured to perform blind detection in the at least two actual durations in a case that the number of the actual duration is at least two.

The first occasion is a start time or an end time of a maximum duration of the early indication signal, or, the first occasion is a start time or an end time of an actual duration of the early indication signal.

The second occasion is a start time or an end time of time domain transmission unit(s) where the PDCCH is located, and the time domain transmission unit(s) comprises any of the following: a time domain symbol, a subframe or a slot.

The duration of the time gap is related to at least one of the following:

a type of a receiver that receives the early indication signal;

a preset behavior of the user equipment, where the preset behavior includes: the user equipment performing downlink synchronization only based on the early indication signal, or, the user equipment performing downlink synchronization based on the early indication signal and a synchronous signal block, or, the user equipment performing downlink synchronization only based on a synchronous signal block; or, a frequency domain transmission resource of the early indication signal, and a frequency domain transmission resource of the PDCCH corresponding to the early indication signal.

The first occasion or the second occasion is configured by a network device for the user equipment, or, the first occasion or the second occasion is determined by the user equipment based on identification information of the user equipment.

The time gap is determined by the user equipment, or, the time gap is configured by a network device for the user equipment, or the time gap is predefined by a protocol.

The time gap is configured for one user equipment or a group of user equipments by the network device through preset signaling, and the preset signaling includes at least one of: broadcast signaling, radio resource control (RRC) signaling, media access control (MAC) control element (CE) or a PDCCH.

The user equipment 600 also includes:

a second determining module, configured to determine a target synchronization manner for downlink synchronization based on the time gap in a case that the time gap is configured for the user equipment by the network device or the time gap is predefined by the protocol, where the target synchronization manner includes: performing downlink synchronization based on the early indication signal, or, performing downlink synchronization based on the early indication signal and a synchronous signal block, or, performing downlink synchronization based on a synchronous signal block.

It should be note that, in some embodiments of the present disclosure, the time gap between the first occasion and the second occasion is determined by the user equipment, and the occasion of the early indication signal or the occasion of the PDCCH corresponding to the early indication signal is determined based on the time gap. In this way, the user equipment can perform detection at the corresponding time, which further reduces blind detection complexity and detection power consumption for the user equipment. In addition, in some embodiments of the present disclosure, time gaps with different lengths can be determined based on user equipments that are of different types and with different capabilities, which reduces the unnecessary latency between the early indication signal and the corresponding PDCCH.

Figure 7:
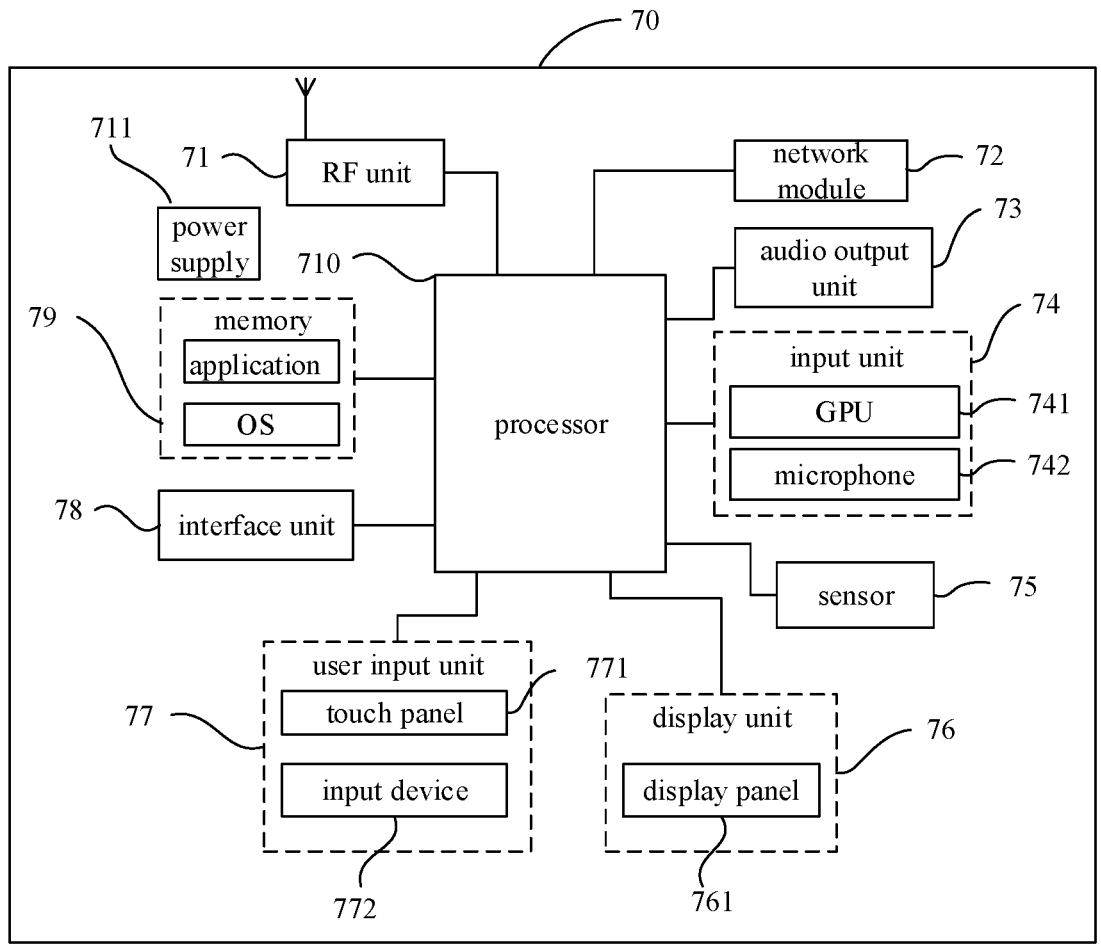
FIG. 7 is a block diagram of a user equipment according to some embodiments of the present disclosure.

In order to better achieve the above object, further, FIG. 7 is a schematic diagram of a hardware structure of a user equipment for implementing various embodiments of the present disclosure. The user equipment 70 includes, but is not limited to, a radio frequency unit 71, a network module 72, an audio output unit 73, an input unit 74, a sensor 75, a display unit 76, a user input unit 77, an interface unit 78, a memory 79, a processor 710, and a power supply 711, etc. Those skilled in the art can understand that the structure of the user equipment shown in FIG. 7 does not constitute a limitation to the user equipment, and the user equipment may include more or fewer components than those shown in the figure, or have some components combined, or use a different arrangement of the components. In some embodiments of the present disclosure, the user equipment includes, but is not limited to, a mobile phone, a tablet computer, a notebook computer, a palmtop computer, a vehicle-mounted terminal, a wearable device, a pedometer, or the like.

The radio frequency unit 71 is used for sending and receiving data under the control of the processor 710.

The processor 710 is configured to obtain a time gap between a first occasion and a second occasion, where the first occasion is an occasion of an early indication signal, and the second occasion is an occasion of a physical downlink control channel (PDCCH) corresponding to the early indication signal; and determine the occasion of the early indication signal or the occasion of the PDCCH corresponding to the early indication signal.

In some embodiments of the present disclosure, the time gap between the first occasion and the second occasion is determined by the user equipment, and the occasion of the early indication signal or the occasion of the PDCCH corresponding to the early indication signal is determined based on the time gap. In this way, the user equipment can perform detection upon arrival of the corresponding time, which further reduces blind detection complexity and detection power consumption for the user equipment. In addition, in some embodiments of the present disclosure, time gaps with different lengths can be determined based on user equipments that are of different types and with different capabilities, which reduces the unnecessary latency between the early indication signal and the corresponding PDCCH.

It should be understood that, in the embodiments of the present disclosure, the radio frequency unit 71 may be configured to receive and send information, or to receive and send signals in a call. Specifically, the radio frequency unit 71 delivers the downlink data received from a base station to the processor 710; and transmits the uplink data to the base station. Generally, the radio frequency unit 71 includes, but is not limited to, an antenna, at least one amplifier, a transceiver, a coupler, a low noise amplifier, a duplexer, or the like. In addition, the radio frequency unit 71 may communicate with a network or other devices via a wireless communication system.

The user equipment provides users with wireless broadband Internet access via the network module 72, such as helping users send and receive emails, browse web pages and access streaming media.

The audio output unit 73 may convert audio data received by the radio frequency unit 71 or the network module 72 or stored in the memory 79 into audio signals and output them as sound. Moreover, the audio output unit 73 may provide audio output (for example, call signal reception sound, message reception sound, etc.) related to a specific function performed by the user equipment 70. The audio output unit 73 includes a speaker, a buzzer, a receiver, or the like.

The input unit 74 is configured to receive audio or video signals. The input unit 74 may include a graphics processing unit (GPU) 741 and a microphone 742. The graphics processing unit 741 is configured to process image data of still pictures or videos obtained via an image capture device (such as a camera) in an image capture mode or a video capture mode. The processed image frames may be displayed in the display unit 76. The image frames processed by the graphics processing unit 741 may be stored in the memory 79 (or other storage medium) or transmitted via the radio frequency unit 71 or the network module 72. The microphone 742 may receive sound, and may process the sound into audio data. The processed audio data may be converted into a format for outputting that can be transmitted via the radio frequency unit 71 to a mobile communication base station in the case of a telephone call mode.

The user equipment 70 further includes at least one sensor 75, such as an optical sensor, a motion sensor, or other sensors. Specifically, the optical sensor includes an ambient light sensor and a proximity sensor. The ambient light sensor may adjust brightness of the display panel 761 according to the brightness of the ambient light, and the proximity sensor may close the display panel 761 and/or backlight when the user equipment 70 approaches to the ear. As a type of motion sensor, an accelerometer sensor may detect the magnitude of acceleration in various directions (usually three-axis directions), and detect the magnitude and direction of gravity when in the stationary state. The accelerometer sensor may be applied to identifying the pose of the user equipment (such as switching of horizontal and vertical screen, a correlated game, magnetometer pose calibration), a function about vibration recognition (such as pedometer, tapping). The sensor 75 may include a fingerprint sensor, a pressure sensor, an iris sensor, a molecular sensor, a gyroscope, a barometer, a hygrometer, a thermometer, an infrared sensor, or the like, which are not described herein.

The display unit 76 is configured to display information inputted by the user or information provided for the user. The display unit 76 may include a display panel 761. The display panel 761 may be configured in the form of a liquid crystal display (LCD), an organic light-emitting diode (OLED), or the like.

The user input unit 77 may be configured to receive inputted numeric or character information, and generate key signal inputs related to user settings and function control of the user equipment. Specifically, the user input unit 77 includes a touch panel 771 and other input device 772. The touch panel 771, also known as a touch screen, may collect a touch operation of a user thereon or thereby (for example, an operation on or around the touch panel 771 that is made by a user with a finger, a touch pen or any other suitable object or accessory). The touch panel 771 may include two parts: a touch detection device and a touch controller. The touch detection device detects touch orientation of the user, detects a signal caused by the touch operation, and transmits the signal to the touch controller. The touch controller receives touch information from the touch detection device, converts the touch information into contact coordinates, and transmits the contact coordinates to the processor 710. The touch controller may receive a command from the processor 710 and executes the command. In addition, the touch panel 771 may be implemented by various types such as a resistive panel, a capacitive panel, an infrared panel, or a surface acoustic wave panel. In addition to the touch panel 771, the user input unit 77 may include other input device 772. Specifically, the other input device 772 may include, but is not limited to, a physical keyboard, a function key (such as a volume control key, a switch key), a trackball, a mouse, or a joystick, which are not described herein.

Further, the display panel 761 may be covered by the touch panel 771. When the touch panel 771 detects a touch operation on or near the touch panel 771, the touch panel 771 transmits the touch operation to the processor 710 to determine the type of the touch event, and the processor 710 provides a corresponding visual output in the display panel 761 according to the type of touch event. Although the touch panel 771 and the display panel 761 are implemented as two independent components to implement the input and output functions of the user equipment in FIG. 7, in some embodiments, the touch panel 771 and the display panel 761 may be integrated to implement the input and output functions of the user equipment, which are not limited herein.

The interface unit 78 is an interface through which an external device is connected to the user equipment 70. For example, the external device may include a wired or wireless headset port, an external power (or battery charger) port, a wired or wireless data port, a memory card port, a port for connecting a device with an identity module, an audio input/output (I/O) port, a video I/O port, a headphone port, etc. The interface unit 78 may be configured to receive input (e.g., data information, power, etc.) from an external device and transmit the received input to one or more elements in the user equipment 70 or may be configured to transmit data between the user equipment 70 and the external device.

The memory 79 may be configured to store software programs and various data. The memory 79 may mainly include a program storage region and a data storage region, where the program storage region may store an operating system, an application (such as a sound playback function, an image playback function, etc.) required for at least one function; the data storage region may store data (such as audio data, a phone book, etc.) created according to the use of the mobile phone. In addition, the memory 79 may include a high-speed random access memory, and may include a non-volatile memory, such as at least one magnetic disk storage device, a flash memory device, or other volatile solid-state storage device.

The processor 710 is a control center of the user equipment, which uses various interfaces and lines to connect various parts of the entire user equipment. The processor 710 runs or executes software programs and/or modules stored in the memory 79 and calls data stored in the memory 79, to execute various functions of the user equipment and process data, so as to monitor the user equipment as a whole. The processor 710 may include one or more processing units. Optionally, the processor 710 may integrate an application processor and a modem processor. The application processor mainly processes an operating system, a user interface, an application, etc., and the modem processor mainly processes wireless communications. It can be understood that the foregoing modem processor may not be integrated into the processor 710.

The user equipment 70 may further include a power supply 711 (such as a battery) for supplying power to various components. Optionally, the power supply 711 may be logically connected to the processor 710 through a power management system, so as to implement functions, such as management of charging and discharging, and power consumption management, via the power management system.

In addition, the user equipment 70 may include some functional modules that are not shown, which are not described herein.

Optionally, some embodiments of the present disclosure further provide a user equipment, including a processor 710, a memory 79, and a computer program stored in the memory 79 and executable by the processor 710. The computer program, when being executed by the processor 710, performs various processes of the above embodiments of the method for detecting information, and the same technical effects can be achieved, which is not repeated herein to avoid repetition. The user equipment may be a wireless user equipment or a wired user equipment. The wireless user equipment may be a device that provides voice and/or other service data connectivity to the user, a handheld device with wireless connection function, or other processing equipment connected to a wireless modem. The wireless user equipment may communicate with one or more core networks via a radio access network (RAN). The wireless user equipment may be a mobile terminal, such as a mobile phone (or called a "cellular" phone) and a computer with a mobile terminal. For example, it may be a portable, pocket-sized, handheld, computer-built-in or vehicle-mounted mobile device, which exchange language and/or data with the radio access network. For example, it may be Personal Communication Service (PCS) phone, cordless phone, Session Initiation Protocol (SIP) phone, Wireless Local Loop (WLL) station, Personal Digital Assistant (PDA) or other equipment. The wireless user equipment may also be referred to as a system, a subscriber unit, a subscriber station, a mobile station, a mobile, a remote station, a remote terminal, an access terminal, a user terminal, a user agent, a user device or a user equipment, which are not limited here.

Some embodiments of the present disclosure also provide a computer readable storage medium. A computer program is stored in the computer readable storage medium. The computer program, when being executed by a processor, performs various processes of the above embodiments of the method for detecting information, which can achieve the same technical effects. To avoid repetition, details are not described herein. The computer readable storage medium may be a volatile storage medium or a non-volatile storage medium, or may include both a volatile storage medium and a non-volatile storage medium, such as a read-only memory (ROM), a random access memory (RAM), a magnetic disk or an optical disk, etc.

The method for detecting information of the present disclosure is described in the above embodiment from the user equipment side. The method for transmitting information on the network device side is described in the following embodiments in conjunction with the accompanying drawings.

Figure 8:
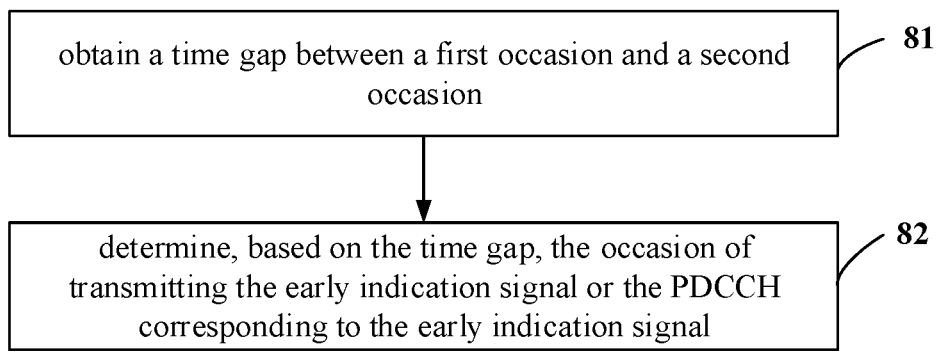
FIG. 8 is a schematic flowchart of a method for transmitting information according to some embodiments of the present disclosure.

As shown in FIG. 8, the method for transmitting information of some embodiments of the present disclosure, operable by a network device, includes the following steps:

Step 81 includes: obtaining a time gap between a first occasion and a second occasion.

The first occasion is an occasion of an early indication signal, and the second occasion is an occasion of a physical downlink control channel (PDCCH) corresponding to the early indication signal. The early indication signal includes at least one of: a wake-up signal (WUS) or a go-to-sleep signal (GTS). The time gap is determined and reported by the user equipment, or the time gap is determined by the network device. The first occasion or the second occasion is configured by the network device for the user equipment, or the first occasion or the second occasion is determined by the user equipment based on identification information of the user equipment.

Step 82 includes: determining, based on the time gap, the occasion of transmitting the early indication signal or the occasion of transmitting the PDCCH corresponding to the early indication signal.

Step 82 may be implemented in, but not limited to, the following manners:

Corresponding to the first manner, if the first occasion has been determined, the occasion of transmitting the PDCCH corresponding to the early indication signal is determined based on the first occasion and the time gap. The first occasion is determined by the network device, or the first occasion is determined and reported by the user equipment based on the identification information (UE ID) of the user equipment.

Or, corresponding to the second manner, if the second occasion has been determined, the occasion of transmitting the early indication signal is determined based on the second occasion and the time gap. The second occasion is determined by the network device, or the first occasion is determined and reported by the user equipment based on the identification information (UE ID) of the user equipment.

In an embodiment, after step 82, the method further includes: transmitting the early indication signal at the determined occasion of transmitting the early indication signal, or transmitting the PDCCH at the determined occasion of transmitting the PDCCH corresponding to the early indication signal.

Optionally, the step of determining the occasion of transmitting the early indication signal includes: determining a start time or an end time of a maximum duration of transmitting the early indication signal, or determining a start time or an end time of an actual duration of transmitting the early indication signal. The number of the actual duration is at least one, and the start time of each of the at least one actual duration is the same as the start time of the maximum duration of the early indication signal; or, the number of the actual duration is at least one, and the end time of each of the at least one actual duration is the same as the end time of the maximum duration.

In some optional embodiments, the first occasion is a start time or an end time of a maximum duration of the early indication signal, that is, the occasion of the early indication signal is the start time or the end time of the maximum duration of the early indication signal, where the maximum duration of the early indication signal is explained as follows. In order to improve the transmission reliability of the early indication signal, different numbers of repetitions of the early indication signal may be set for different user equipments or cells; the different numbers of repetitions are realized based on repeatedly transmitting time domain transmission unit(s) in the time, and the time domain transmission unit(s) may be a frame, a subframe (subframe), a slot (slot) or a time domain symbol (an OFDM symbol). For the specific configuration manner, reference can be made to that of the embodiments of the user equipment side, which is not described herein Or, the first occasion is a start time or an end time of an actual duration of the early indication signal, that is, the occasion of the early indication signal is the start time or the end time of the actual duration of the early indication signal. The duration corresponding to the actual number of repetitions of the early indication signal is the actual duration (actual duration) of the early indication signal.

The actual duration has only one possible position (the only position) within the maximum duration, that is, there is a first duration between the start time of the actual duration of the early indication signal and the start time of the longest duration of the early indication signal, where the first duration is greater than or equal to 0 time domain transmission unit. When the first duration is 0 time domain transmission unit, the start time of the actual duration of the early indication signal is the same as the start time of the longest duration (i.e., coinciding). Or, there is a second duration between the end time of the actual duration of the early indication signal and the end time of the longest duration of the early indication signal, where the second duration is greater than or equal to 0 time domain transmission unit. When the second duration is 0 time domain transmission unit, the end time of the actual duration of the early indication signal is the same as the end time of the longest duration (i.e., coinciding).

Optionally, the second occasion is a start time or an end time of time domain transmission unit(s) where the PDCCH is located, where the time domain transmission unit(s) includes any one of: a time domain symbol, a subframe, or a slot. In other words, the occasion of the PDCCH is the start time or the end time of the slot, subframe, or time domain symbol where the PDCCH is located.

The duration of the time gap is related to at least one of the following:

A type of a receiver that receives the early indication signal. The type of the receiver includes a main receiver and a non-main receiver (or referred to as other receiver, dedicated receiver). That is, the corresponding duration of the time gap for a case where the user equipment uses the independent non-main receiver to receive the early indication signal is different from the corresponding duration of the time gap for a case where the user equipment uses the main receiver receive the early indication signal.

A preset behavior of the user equipment. The preset behavior includes: the user equipment performing downlink synchronization only based on the early indication signal, or, the user equipment performing downlink synchronization based on the early indication signal and a synchronous signal block, or, the user equipment performing downlink synchronization only based on a synchronous signal block. If the user equipment only uses WUS to perform downlink synchronization, and if the network device sends DTX for several consecutive paging cycles, then in the subsequent the time for downlink synchronization may be relatively long when the user equipment receives non-DTX WUS, resulting in increased time gap between WUS and PDCCH corresponding to the WUS; if the user equipment periodically performs downlink synchronization based on SSB, the user equipment may flexibly set the size of the period to maintain good downlink synchronization, and in the subsequent the time for downlink synchronization may be relatively short when the user equipment receives non-DTX WUS, resulting in increased time gap between WUS and PDCCH corresponding to the WUS. Therefore, when the behaviors of the user equipment are different, the values of the time gaps reported by the user equipment are also different.

A frequency domain transmission resource of the early indication signal, and a frequency domain transmission resource of the PDCCH corresponding to the early indication signal. In an embodiment, the time gap corresponding to a case where the center frequency of the frequency domain resource of the user equipment for receiving WUS or GTS is different from the center frequency of the frequency domain resource of the user equipment for receiving PDCCH, is longer than, the time gap corresponding to a case where the center frequency of the frequency domain resource of the user equipment for receiving WUS or GTS is the same as the center frequency of the frequency domain resource of the user equipment for receiving PDCCH; the frequency domain resource may be a bandwidth part (BWP), a bandwidth or a channel.

The time gap is determined and reported by the user equipment, or the time gap is determined by the network device, or the time gap is predefined by the protocol. Specifically, the time gap includes at least one of: a first time gap determined by the user equipment, or a second time gap configured by the network device for the user equipment.

When the time gap includes the second time gap, corresponding to the second scenario and the third scenario, the network device may configure the second time gap to the user equipment in the following manner: sending the time gap to the user equipment through preset signaling. The preset signaling includes at least one of: broadcast signaling, radio resource control (RRC) signaling, media access control (MAC) control element (CE), or a PDCCH.

It should be noted that the embodiments applicable to the user equipment side are all applicable to the embodiments of the network device, which are not repeated herein. In the method for transmitting information according to some embodiments of the present disclosure, the time gap between the first occasion and the second occasion is determined by the network device, and the occasion of the early indication signal or the occasion of the PDCCH corresponding to the early indication signal is determined based on the time gap. In this way, the user equipment can determine the corresponding time based on the time gap and perform detection at the corresponding time, which further reduces blind detection complexity and detection power consumption for the user equipment. In addition, in some embodiments of the present disclosure, time gaps with different lengths can be determined based on user equipments that are of different types and with different capabilities, which reduces the unnecessary latency between the early indication signal and the corresponding PDCCH.

The method for transmitting information in different scenarios is described in the above embodiments, and the corresponding network device is described in the following embodiments in conjunction with the drawings.

Figure 9:
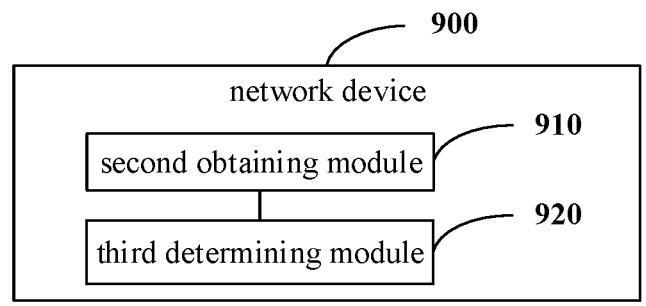
FIG. 9 is a schematic diagram of a module structure of a network device according to some embodiments of the present disclosure.

As shown in FIG. 9, the network device 900 of some embodiments of the present disclosure can realize the details of the method in the above embodiments: obtaining the time gap between the first occasion and the second occasion, and determining, based on the time gap, the occasion of transmitting the early indication signal or the occasion of transmitting the PDCCH corresponding to the early indication signal, which can achieve the same effect. The network device 900 specifically includes the following functional modules:

a second obtaining module 910, configured to obtain a time gap between a first occasion and a second occasion, where the first occasion is an occasion of an early indication signal, and the second occasion is an occasion of a physical downlink control channel (PDCCH) corresponding to the early indication signal; and a third determining module 920, configured to determine, based on the time gap, the occasion of transmitting the early indication signal or the occasion of transmitting the PDCCH corresponding to the early indication signal.

The network device 900 may further include: a first transmitting module, configured to transmit the early indication signal at the determined occasion of transmitting the early indication signal, or to transmit the PDCCH at the determined occasion of transmitting the PDCCH corresponding to the early indication signal.

The third determining module 920 includes:
a third determining submodule, configured to determine the occasion of transmitting the PDCCH corresponding to the early indication signal based on the first occasion and the time gap, if the first occasion has been determined.

The third determining module 920 also includes:
a fourth determining submodule, configured to determine the occasion for transmitting the early indication signal based on the second occasion and the time gap, if the second occasion has been determined.

The fourth determining submodule includes:
a third determining unit, configured to determine a start time or an end time of a maximum duration of transmitting the early indication signal,
or,
a fourth determining unit, configured to determine a start time or an end time of an actual duration of transmitting the early indication signal.

The number of the actual duration is at least one, and the start time of each of the at least one actual duration is the same as the start time of the maximum duration of the early indication signal; or, the number of the actual duration is at least one, and the end time of each of the at least one actual duration is the same as the end time of the maximum duration.

The first occasion is a start time or an end time of a maximum duration of the early indication signal, or, the first occasion is a start time or an end time of an actual duration of the early indication signal.

The start time of the actual duration and the start time of the maximum duration are separated by a first duration or the end time of the actual duration and the end time of the maximum duration are separated by a second duration.

The start time of the actual duration is the same as the start time of the maximum duration, or the end time of the actual duration is the same as the end time of the maximum duration.

The second occasion is a start time or an end time of time domain transmission unit(s) where the PDCCH is located, and the time domain transmission unit(s) comprises any of the following: a time domain symbol, a subframe or a slot.

The duration of the time gap is related to at least one of the following:
a type of a receiver that receives the early indication signal;
a preset behavior of the user equipment, wherein the preset behavior comprises: the user equipment performing downlink synchronization only based on the early indication signal, or, the user equipment performing downlink synchronization based on the early indication signal and a synchronous signal block, or, the user equipment performing downlink synchronization only based on a synchronous signal block; or,
a frequency domain transmission resource of the early indication signal, and a frequency domain transmission resource of the PDCCH corresponding to the early indication signal.

The time gap is determined and reported by the user equipment, or the time gap is determined by the network device, or the time gap is predefined by the protocol.

The network device 900 also includes:
a transmitting module, configured to send the time gap to the user equipment through preset signaling when the time gap is determined by the network device, where the preset signaling includes at least one of: broadcast signaling, radio resource control (RRC) signaling, media access control (MAC) control element (CE) or a PDCCH.

It should be noted that in some embodiments of the present disclosure, the time gap between the first occasion and the second occasion is determined by the network device, and the occasion of the early indication signal or the occasion of the PDCCH corresponding to the early indication signal is determined based on the time gap. In this way, the user equipment can determine the corresponding time based on the time gap and perform detection at the corresponding time, which further reduces blind detection complexity and detection power consumption for the user equipment. In addition, in some embodiments of the present disclosure, time gaps with different lengths can be determined based on user equipments that are of different types and with different capabilities, which reduces the unnecessary latency between the early indication signal and the corresponding PDCCH.

It should be understood that the division of the various modules of the network device and the user equipment is only a division based on logical functions, which may be fully or partially integrated into a physical entity in actual implementations, or may be physically separated. These modules may all be implemented in the form of software called by processing elements; or may all be implemented in the form of hardware; or some of the modules may be implemented in the form of software called by processing elements, and some of the modules may be implemented in the form of hardware. For example, the determining module may be a separately established processing element, or it may be integrated in a chip of the above-mentioned device for implementation. In addition, it may be stored in the memory of the above-mentioned device in the form of program code, and a certain processing element of the above-mentioned device may call and execute the functions of the above-mentioned determining module. The implementation of other modules is similar. In addition, all or part of these modules may be integrated together or implemented independently. The processing element described herein may be an integrated circuit with signal processing capability. In the implementation process, each step of the above method or each of the above modules may be implemented by a hardware integrated logic circuit or software instructions in the processor element.

For example, the above modules may be one or more integrated circuits configured to implement the above methods, for example: one or more application specific integrated circuits (ASICs), or one or more microprocessors (digital signal processor, DSP), or one or more field programmable gate array (FPGA), etc. For another example, when a certain module of the above modules is implemented in the form of program code scheduled by a processing element, the processing element may be a general-purpose processor such as a central processing unit (CPU) or other processors that can call program code. For another example, these modules can be integrated together and implemented in the form of a system-on-a-chip (SOC).

In order to better achieve the above object, embodiments of the present disclosure also provide a network device. The network device includes a processor, a memory, and a computer program stored in the memory and executable by the processor. The processor is configured to, when executing the computer program, perform the steps of the method for transmitting information described above. Embodiments of the present disclosure also provide a computer readable storage medium having a computer program stored thereon. The computer program, when being executed by a processor, configure the processor to perform the steps of the method for transmitting information described above.

Figure 10:
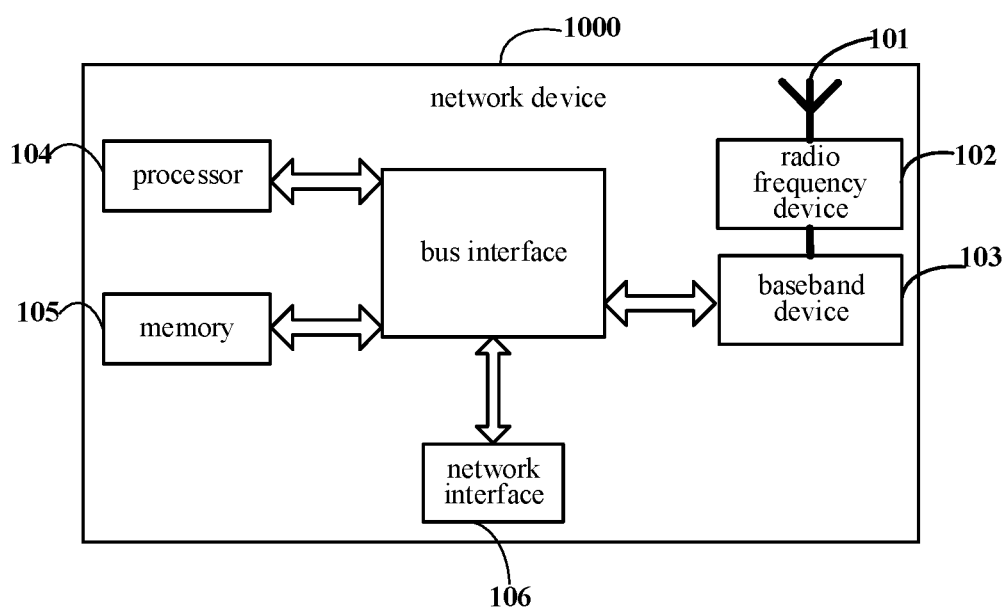
FIG. 10 is a block diagram of a network device according to some embodiments of the present disclosure.

Specifically, embodiments of the present disclosure also provide a network device. As shown in FIG. 10, the network device 1000 includes: an antenna 101, a radio frequency device 102, and a baseband device 103. The antenna 101 is connected to the radio frequency device 102. In the uplink direction, the radio frequency device 102 receives information through the antenna 101, and sends the received information to the baseband device 103 for processing. In the downlink direction, the baseband device 103 processes the information to be sent and sends it to the radio frequency device 102, and the radio frequency device 102 processes the received information and sends it via the antenna 101.

The frequency band processing device may be located in the baseband device 103, the method executed by the network device in the above embodiments may be implemented in the baseband apparatus 103, and the baseband device 103 includes a processor 104 and a memory 105.

The baseband device 103 may include, for example, at least one baseband board, and multiple chips are arranged on the baseband board, as shown in FIG. 10. One of the chips is, for example, a processor 104, which is connected to a memory 105 to call the program in the memory 105 to execute operations of the network device in the above method embodiments.

The baseband device 103 may further include a network interface 106 for exchanging information with the radio frequency device 102, and the interface is, for example, a common public radio interface (common public radio interface, CPRI).

The processor here may be a single processor or a collective term for multiple processing elements. For example, the processor may be a CPU or an ASIC, or may be configured as one or more integrated circuits to implement the method executed by the above network devices, such as one or more microprocessors (DSPs), or, one or more field programmable gate arrays (FPGAs), etc. The storage element may be a memory or a collective term for multiple storage elements.

The memory 105 may be a volatile memory or a non-volatile memory, or may include both volatile and non-volatile memories. The non-volatile memory may be a read-only memory (ROM), a programmable read-only memory (Programmable ROM, PROM), an erasable programmable read-only memory (Erasable PROM, EPROM), or an electrically erasable programmable read-only memory (Electrically EPROM, EEPROM) or a flash memory. The volatile memory may be a random access memory (RAM) that acts as a high-speed external cache. By way of example and not limitation, various kinds of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SDRAM) or a direct rambus random access memory (Direct Rambus RAM, DRRAM). The memory 105 of the present disclosure is intended to include, without being limited to, these and any other suitable types of memories.

Specifically, the network device of some embodiments of the present disclosure further includes: a computer program that is stored in the memory 105 and may run on the processor 104. The processor 104 calls the computer program in the memory 105 to execute the method executed by the modules shown in FIG. 9.

Specifically, the computer program, when being called by the processor 104, performs the following operation: obtaining a time gap between a first occasion and a second occasion, wherein the first occasion is an occasion of an early indication signal, and the second occasion is an occasion of a physical downlink control channel (PDCCH) corresponding to the early indication signal; and determining, based on the time gap, the occasion of transmitting the early indication signal or the occasion of transmitting the PDCCH corresponding to the early indication signal.

Specifically, the computer program, when being called by the processor 104, performs the following operation: determining the occasion of transmitting the PDCCH corresponding to the early indication signal based on the first occasion and the time gap, in a case that the first occasion is determined.

Specifically, the computer program, when being called by the processor 104, performs the following operation: determining the occasion of transmitting the early indication signal based on the second occasion and the time gap, in a case that the second occasion is determined.

Specifically, the computer program, when being called by the processor 104, performs the following operation: determining a start time or an end time of a maximum duration of transmitting the early indication signal, or, determining a start time or an end time of an actual duration of transmitting the early indication signal.

The number of the actual duration is at least one, and the start time of each of the at least one actual duration is the same as the start time of the maximum duration of the early indication signal; or, the number of the actual duration is at least one, and the end time of each of the at least one actual duration is the same as the end time of the maximum duration.

The first occasion is a start time or an end time of a maximum duration of the early indication signal, or, the first occasion is a start time or an end time of an actual duration of the early indication signal.

The second occasion is a start time or an end time of time domain transmission unit(s) where the PDCCH is located, and the time domain transmission unit(s) comprises any of the following: a time domain symbol, a subframe or a slot.

The duration of the time gap is related to at least one of the following:

a type of a receiver that receives the early indication signal;

a preset behavior of a user equipment, wherein the preset behavior comprises: the user equipment performing downlink synchronization only based on the early indication signal, or, the user equipment performing downlink synchronization based on the early indication signal and a synchronous signal block, or, the user equipment performing downlink synchronization only based on a synchronous signal block; or, a frequency domain transmission resource of the early indication signal, and a frequency domain transmission resource of the PDCCH corresponding to the early indication signal.

The time gap is determined and reported by the user equipment, or the time gap is determined by the network device, or the time gap is predefined by the protocol.

In a case that the time gap is determined by the network device, the computer program, when being called by the processor 104, performs the following operation: transmitting the time gap to the user equipment through preset signaling, wherein the preset signaling comprises at least one of: broadcast signaling, radio resource control (RRC) signaling, media access control (MAC) control element (CE) or a PDCCH.

The network device may be a base station (Base Transceiver Station, BTS) in Global System for Mobile Communications (GSM) or Code-Division Multiple Access (CDMA), or may be a base station (NodeB) in Wideband Code Division Multiple Access (WCDMA), or may be an evolutional base station (evolutional Node B, eNB or e-NodeB) in LTE, or may be a relay station or an access point, or may be a base station in the future 5G network, etc., which is not limited herein.

In some embodiments of the present disclosure, the time gap between the first occasion and the second occasion is determined by the network device, and the occasion of the early indication signal or the occasion of the PDCCH corresponding to the early indication signal is determined based on the time gap. In this way, the user equipment can determine the corresponding time based on the time gap and perform detection at the corresponding time, which further reduces blind detection complexity and detection power consumption for the user equipment. In addition, in some embodiments of the present disclosure, time gaps with different lengths can be determined based on user equipments that are of different types and with different capabilities, which reduces the unnecessary latency between the early indication signal and the corresponding PDCCH.

Those skilled in the art will appreciate that the units and the algorithm steps described in conjunction with the embodiments according to the present disclosure may be implemented in the form of electronic hardware or a combination of computer software and electronic hardware. Whether these functions are performed in hardware or in software depends on the specific application and design constraints of the technical solution. Those skilled in the art may use different methods to implement the described functions for each particular application, and such implementations are not to be considered as departing from the scope of the present disclosure.

Those skilled in the art can clearly understand that, for the sake of easiness and conciseness of description, reference can be made to the corresponding processes in the foregoing method embodiments for specific operating processes of the systems, the devices and the units described above, and a repeated description thereof is omitted herein.

It should be understood that in the embodiments according to the present disclosure, the disclosed device and method may be implemented in other ways. For example, the described embodiments directed to the device are merely exemplary. For example, the units are divided merely in logical function, which may be divided in another way in actual implementation, e.g., multiple units or components may be combined or integrated into another device, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The units described as separate components may or may not be physically separated, and the components shown as units may or may not be physical units, that is, they may be located in one place or distributed over multiple network units. Some or all of the units may be selected according to practical needs to achieve the object of the technical solutions of the embodiments of the present disclosure.

In addition, functional units in various embodiments of the present disclosure may be integrated into one processing unit, or may be physically independent, or two or more units may be integrated into one unit.

If the function is implemented in the form of a software functional unit, and sold or used as a standalone product, it may be stored in a computer readable storage medium. Based on this understanding, essence of the technical solution of the present disclosure, or the part contributing to the related technologies, or all or part of the technical solution, can be embodied in the form of a software product. The computer software product is stored in a storage medium, and the software product includes a number of instructions to enable a device (which may be a personal computer, a server, or a network device, etc.) to perform all or part of the steps of the method described in the various embodiments of the present disclosure. The storage medium includes a USB flash disk, a mobile hard disk, a read-only memory (ROM), a random access memory (RAM), a magnetic disk, an optical disk, and other medium which can store program code.

In addition, it should be pointed out that in the device and method of the present disclosure, apparently, the various components or steps may be decomposed and/or recombined. These decomposition and/or recombination should be regarded as equivalent solutions of the present disclosure. In addition, the steps of performing the above-mentioned series of processing may naturally be performed in chronological sequence in the description order, but do not necessarily need to be performed in chronological sequence, and some steps may be performed in parallel or independently of each other. Those of ordinary skill in the art can understand that all or any of the steps or components of the method and device of the present disclosure may be used in any computing device (including a processor, a storage medium, etc.) or network of a computing device in the form of hardware firmware, software, or a combination thereof. This can be achieved by those of ordinary skill in the art using their basic programming skills after reading the descriptions of the present disclosure.

Therefore, the purpose of the present disclosure can also be realized by running a program or a group of programs on any computing device. The computing device may be a well-known general-purpose device. Therefore, the purpose of the present disclosure can also be achieved by only providing a program product including program code for implementing the method or device. That is, such a program product also constitutes the present disclosure, and a storage medium storing such a program product also constitutes the present disclosure. Apparently, the storage medium may be any well-known storage medium or any storage medium developed in the future. It should also be pointed out that, in the device and method of the present disclosure, apparently, the various components or steps may be decomposed and/or recombined. These decomposition and/or recombination should be regarded as equivalent solutions of the present disclosure. In addition, the steps of executing the above-mentioned series of processing may be naturally executed in chronological sequence in the order as described, but do not necessarily need to be performed in chronological sequence. Some steps may be performed in parallel or independently of each other.

Optional embodiments of the present disclosure are described hereinabove. It should be noted that for those of ordinary skill in the art, some improvements and modifications can be made without departing from the principle described in the present disclosure, and these improvements and modifications fall within the protection scope of the present disclosure.

What is claimed is:

1. A method for detecting information, operable by a user equipment, comprising:
    obtaining a time gap between a first occasion and a second occasion, wherein the time gap is configured by a network device for the user equipment, wherein the first occasion is an occasion of an early indication signal, and the second occasion is an occasion of a physical downlink control channel (PDCCH) corresponding to the early indication signal, wherein the early indication signal comprises at least one of a wake-up signal (WUS) or a go-to-sleep signal (GTS);
    determining the second occasion, and determining the occasion of the early indication signal based on the determined second occasion and the time gap, wherein the occasion of the early indication signal is determined by subtracting the time gap from the second occasion;
    detecting whether there is the early indication signal at the determined occasion of the early indication signal;
    performing blind detection for a paging signal or the PDCCH or continuing to sleep, in a case that the early indication signal is detected at the determined occasion of the early indication signal;
    wherein the determining the occasion of the early indication signal comprises: determining a start time or an end time of a maximum duration of the early indication signal, or, determining a start time or an end time of an actual duration of the early indication signal;
    wherein the obtaining the time gap between the first occasion and the second occasion comprises: transmitting a first time gap to the network device, and receiving the time gap configured based on the first time gap by the network device.

2. The method according to claim 1, wherein:
    the number of the actual duration of the early indication signal is more than one, and the start time of each of the more than one actual duration is the same as the start time of the maximum duration of the early indication signal; or,
    the number of the actual duration of the early indication signal is more than one, and the end time of each of the more than one actual duration is the same as the end time of the maximum duration.

3. The method according to claim 1, wherein in a case that the number of the actual duration is at least two, the detecting whether there is the early indication signal at the determined occasion of the early indication signal comprises: performing blind detection in the at least two actual durations.

4. The method according to claim 1, wherein:
    the second occasion is a start time or an end time of time domain transmission unit(s) where the PDCCH is located, and the time domain transmission unit(s) comprises any of the following: a time domain symbol, a subframe or a slot.

5. The method according to claim 1, wherein a duration of the time gap is related to at least one of the following:
    a type of a receiver that receives the early indication signal;
    a preset behavior of the user equipment, wherein the preset behavior comprises: the user equipment performing downlink synchronization only based on the early indication signal, or, the user equipment performing downlink synchronization based on the early indication signal and a synchronous signal block, or, the user equipment performing downlink synchronization only based on a synchronous signal block; or, a frequency domain transmission resource of the early indication signal, and a frequency domain transmission resource of the PDCCH corresponding to the early indication signal.

6. The method according to claim 1, wherein the time gap is configured for the user equipment or a group of user equipments by the network device through preset signaling, and the preset signaling comprises at least one of: broadcast signaling, radio resource control (RRC) signaling, media access control (MAC) control element (CE) or a PDCCH.

7. The method according to claim 1, wherein in a case that the time gap is configured for the user equipment by the network device, after obtaining the time gap between the first occasion and the second occasion, the method further comprises:
determining a target synchronization manner for downlink synchronization based on the time gap, wherein the target synchronization manner comprises: performing downlink synchronization based on the early indication signal, or, performing downlink synchronization based on the early indication signal and a synchronous signal block, or, performing downlink synchronization based on a synchronous signal block.

8. A user equipment, comprising: a processor, a memory, and a program stored on in memory and executable by the processor, wherein the processor is configured to, when executing the program, perform the following steps:
obtaining a time gap between a first occasion and a second occasion, wherein the time gap is configured by a network device for the user equipment, wherein the first occasion is an occasion of an early indication signal, and the second occasion is an occasion of a physical downlink control channel (PDCCH) corresponding to the early indication signal, wherein the early indication signal comprises at least one of a wake-up signal (WUS) or a go-to-sleep signal (GTS);
determining the second occasion, and determining the occasion of the early indication signal based on the determined second occasion and the time gap, wherein the occasion of the early indication signal is determined by subtracting the time gap from the second occasion;
detecting whether there is the early indication signal at the determined occasion of the early indication signal;
performing blind detection for a paging signal or the PDCCH or continuing to sleep, in a case that the early indication signal is detected at the determined occasion of the early indication signal;
wherein the determining the occasion of the early indication signal comprises: determining a start time or an end time of a maximum duration of the early indication signal, or, determining a start time or an end time of an actual duration of the early indication signal,
wherein the obtaining the time gap between the first occasion and the second occasion comprises: transmitting a first time gap to the network device, and receiving the time gap configured based on the first time gap by the network device.

9. A method for transmitting information, operable by a network device, comprising:
obtaining a time gap between a first occasion and a second occasion, wherein the time gap is configured by the network device for a user equipment, wherein the first occasion is an occasion of an early indication signal, and the second occasion is an occasion of a physical downlink control channel (PDCCH) corresponding to the early indication signal, wherein the early indication signal comprises at least one of a wake-up signal (WUS) or a go-to-sleep signal (GTS);
determining the second occasion, and determining the occasion of transmitting the early indication signal based on the determined second occasion and the time gap, wherein the occasion of transmitting the early indication signal is determined by subtracting the time gap from the second occasion;
transmitting the early indication signal at the determined occasion of transmitting the early indication signal;
wherein the determining the occasion of transmitting the early indication signal comprises: determining a start time or an end time of a maximum duration of transmitting the early indication signal, or, determining a start time or an end time of an actual duration of transmitting the early indication signal;
wherein the obtaining the time gap between the first occasion and the second occasion comprises: receiving a first time gap from the user equipment, and configuring the time gap based on the first time gap to transmit the configured time gap.

10. The method according to claim 9, wherein:
the second occasion is a start time or an end time of time domain transmission unit(s) where the PDCCH is located, and the time domain transmission unit(s) comprises any of the following: a time domain symbol, a subframe or a slot.

11. A network device, comprising: a processor, a memory, and a program stored in the memory and executable by the processor, wherein the processor is configured to, when executing the program, perform the steps of the method according to claim 9.

12. The user equipment according to claim 8, wherein:
the number of the actual duration of the early indication signal is more than one, and the start time of each of the more than one actual duration is the same as the start time of the maximum duration of the early indication signal; or,
the number of the actual duration of the early indication signal is more than one, and the end time of each of the more than one actual duration is the same as the end time of the maximum duration.

13. The user equipment according to claim 8, wherein:
in a case that the number of the actual duration is at least two, the processor is configured to, when executing the program, perform the following step: performing blind detection in the at least two actual durations; or,
the second occasion is a start time or an end time of time domain transmission unit(s) where the PDCCH is located, and the time domain transmission unit(s) comprises any of the following: a time domain symbol, a subframe or a slot.

14. The user equipment according to claim 8, wherein a duration of the time gap is related to at least one of the following:
a type of a receiver that receives the early indication signal;
a preset behavior of the user equipment, wherein the preset behavior comprises: the user equipment performing downlink synchronization only based on the early indication signal, or, the user equipment performing downlink synchronization based on the early indication signal and a synchronous signal block, or, the user equipment performing downlink synchronization only based on a synchronous signal block; or, a frequency domain transmission resource of the early indication signal, and a frequency domain transmission resource of the PDCCH corresponding to the early indication signal.

15. The method according to claim 9, wherein:
the number of the actual duration of the early indication signal is more than one, and the start time of each of the more than one actual duration is the same as the start time of the maximum duration of the early indication signal; or,
the number of the actual duration of the early indication signal is more than one, and the end time of each of the more than one actual duration is the same as the end time of the maximum duration.

16. The network device according to claim 11, wherein:
the second occasion is a start time or an end time of time domain transmission unit(s) where the PDCCH is located, and the time domain transmission unit(s) comprises any of the following: a time domain symbol, a subframe or a slot.

17. The method according to claim 1, wherein the number of the actual duration of the early indication signal is more than one; the detecting whether there is the early indication signal at the determined occasion of the early indication signal comprises: detecting whether there is the early indication signal from a first subframe of the more than one actual duration.

18. The method according to claim 9, wherein the number of the actual duration of the early indication signal is more than one; detection of whether there is the early indication signal is performed by the user equipment from a first subframe of the more than one actual duration.

\* \* \* \* \*